Sept. 29, 1959 C. W. MUSSER 2,906,143

STRAIN WAVE GEARING

Filed March 21, 1955 10 Sheets-Sheet 1

INVENTOR.
C. Walton Musser

BY [signature]
ATTORNEYS.

INVENTOR.
C. Walton Musser

BY [signature]
ATTORNEYS.

Sept. 29, 1959 C. W. MUSSER 2,906,143

STRAIN WAVE GEARING

Filed March 21, 1955 10 Sheets-Sheet 3

INVENTOR
C. Walton Musser
BY
[signature]
ATTORNEYS.

Sept. 29, 1959 C. W. MUSSER 2,906,143

STRAIN WAVE GEARING

Filed March 21, 1955 10 Sheets-Sheet 4

INVENTOR
C. Walton Musser
BY
ATTORNEYS

Sept. 29, 1959 C. W. MUSSER 2,906,143

STRAIN WAVE GEARING

Filed March 21, 1955 10 Sheets-Sheet 5

INVENTOR
C. Walton Musser
BY
ATTORNEYS.

INVENTOR
C. Walton Musser
BY
ATTORNEYS.

Sept. 29, 1959 C. W. MUSSER 2,906,143
STRAIN WAVE GEARING
Filed March 21, 1955 10 Sheets-Sheet 7
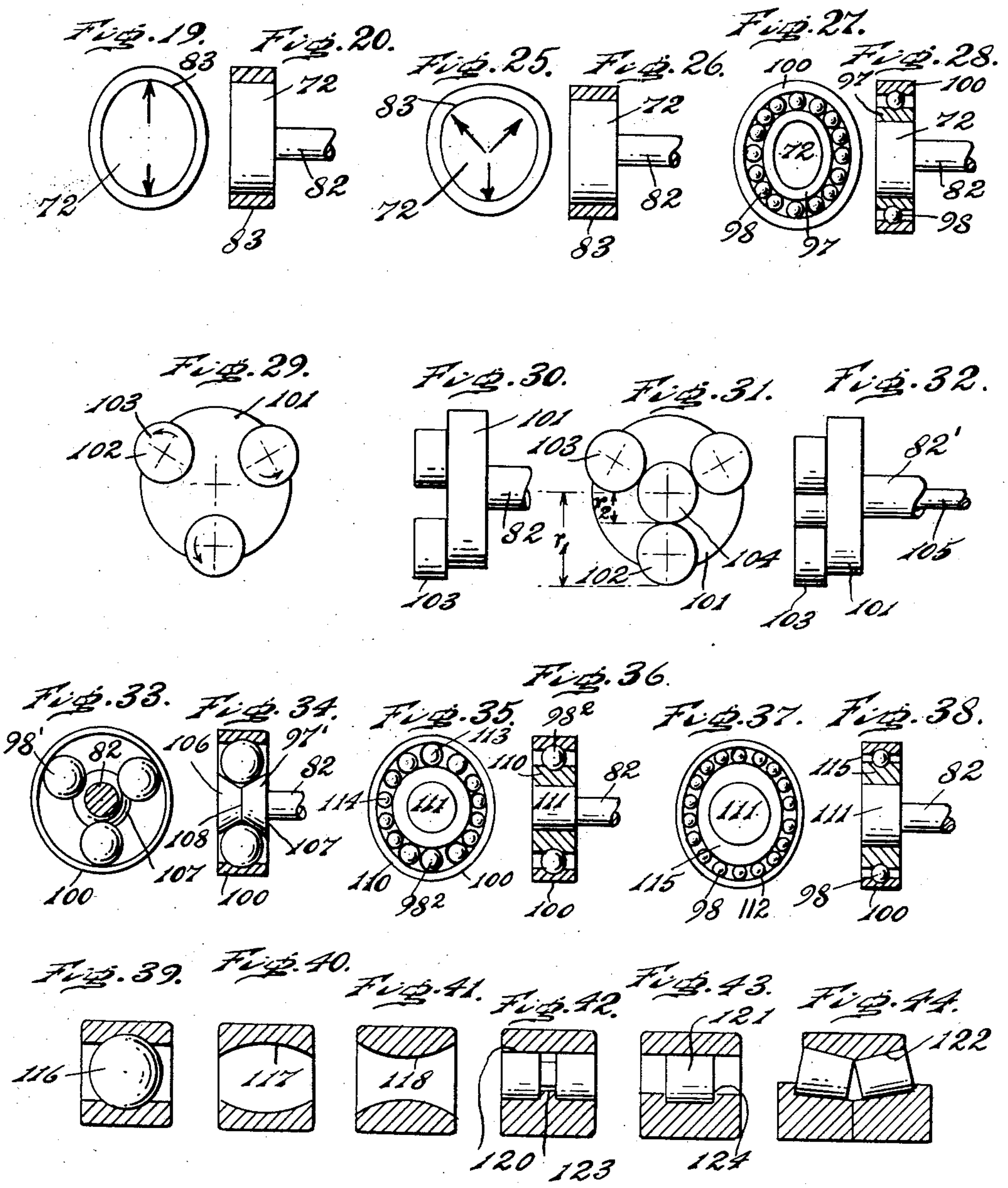
FIG. 19, FIG. 20, FIG. 25, FIG. 26, FIG. 27, FIG. 28, FIG. 29, FIG. 30, FIG. 31, FIG. 32, FIG. 33, FIG. 34, FIG. 35, FIG. 36, FIG. 37, FIG. 38, FIG. 39, FIG. 40, FIG. 41, FIG. 42, FIG. 43, FIG. 44
INVENTOR
C. Walton Musser
BY
ATTORNEYS.

Sept. 29, 1959 C. W. MUSSER 2,906,143

STRAIN WAVE GEARING

Filed March 21, 1955 10 Sheets-Sheet 8

INVENTOR
C. Walton Musser
BY
[signature]
ATTORNEYS.

INVENTOR
C. Walton Musser
BY
ATTORNEYS.

Sept. 29, 1959 C. W. MUSSER 2,906,143

STRAIN WAVE GEARING

Filed March 21, 1955 10 Sheets-Sheet 10

INVENTOR

C. Walton Musser

BY

ATTORNEYS.

United States Patent Office 2,906,143

Patented Sept. 29, 1959

2,906,143

STRAIN WAVE GEARING

C Walton Musser, Levittown, Pa., assignor to United Shoe Machinery Corporation, Flemington, N.J., a corporation of New Jersey Application March 21, 1955, Serial No. 495,479

47 Claims. (Cl. 74—640)

The present invention relates to motion transmitting mechanism, and particularly to gearing in which relative motion occurs between an internal gear and a cooperating external gear.

The species of the present application relating to the dual form and the electromagnetic strain inducer is embodied in my copending application Serial No. 656,572, filed May 2, 1957, for Dual Strain Wave Gearing.

Subject matter relating to spring preloading is contained in my continuation-in-part application Serial No. 779,456, filed December 10, 1958, for Strain Wave Gearing—Spring Preloading. Subject matter relating to adjustment of the strain inducing element, certain features of the bearing elements therein and of the three lobe form are embodied in my continuation-in-part application Serial No. 801,191, filed March 23, 1959, for Strain-Wave Gearing—Strain Inducer Species. The multiple tooth difference is embodied in my divisional application Serial No. 801,192, filed March 23, 1959, for Strain-Wave Gearing—Multiple Tooth Difference. The species in which only one gear is the input appears in my divisional application Serial No. 801,193, filed March 23, 1959, for Strain-Wave Gear—Species in which only one of the gears is input. The species in which the strain inducer is a bearing with elements of variable size is contained in my divisional application Serial No. 801,194, filed March 23, 1959, for Strain-Wave Gearing—Bearing with Variable Elements. The subject matter of the tubular shaft and the output at the same end as the input appears in my divisional application Serial No. 801,195, filed March 23, 1959, for Strain-Wave Gearing—Tubular Shaft.

A purpose of the invention is to secure relative motion between cooperating internal and external gears, by propagating a strain wave which advances an area of contact or preferably a plurality of areas of contact between the respective gears.

A further purpose is to obtain freedom from backlash in gearing and desirably also to make the extent of backlash adjustable.

A further purpose is to obtain extremely precise transmission of motion by gearing or similar mechanisms.

A further purpose is to maintain a large percentage of the teeth of two cooperating gears in contact at any one time, preferably more than 50% of each.

A further purpose is to secure low pitch line velocity in gearing systems.

A further purpose is to avoid concentration of wear on individual teeth, and particularly to distribute the wear uniformly over all the teeth in a gearing system.

A further purpose is to operate gearing with very small tooth motion.

A further purpose is to operate gearing with a very low tooth sliding velocity.

A further purpose is to balance the forces in gearing, and thereby reduce or eliminate any lateral components external to the system.

A further purpose is to develop the power in a gearing system at the point of greatest leverage.

A further purpose is to obtain a large angle of action in gearing.

A further purpose is to secure surface contact rather than point contact or line contact, between teeth of cooperating gears, and desirably also to maintain a relatively large surface of contact for a succession of tooth positions.

A further purpose is to bring gear teeth into mesh by surface sliding in one direction only.

A further purpose is to operate gearing with sinusoidal tooth motion.

A further purpose is to secure a wide variety of available gear reductions by variations in gearing of the same design, and especially to obtain very large gear reductions.

A further purpose is to obtain gear ratios in the range between 10 to 1 and 1 million to 1 from a gearing system.

A further purpose is to obtain a very wide and preferably unlimited ratio selection.

A further purpose is to produce a gearing system with large torque capabilities.

A further purpose is to secure relatively low tooth contact pressures, and thereby minimize the tendency to excessive load concentrations on certain portions of the teeth.

A further purpose is to largely avoid varying loads by virtue of force components produced from gear action.

A further purpose is to operate the gearing with low shear stresses throughout.

A further purpose is to secure a high efficiency on high gear ratios.

A further purpose is to obtain torsional rigidity of the output of a gear train or system.

A further purpose is to secure a gearing system with a high degree of adaptability, and very few parts.

A further purpose is to obtain ease of lubrication in gearing.

A further purpose is to manufacture gearing of very small size, and correspondingly light weight.

A further purpose is to produce gearing by simple manufacturing methods.

A further purpose is to obtain quiet operation of gearing.

A further purpose is to provide a coaxial relationship between input and output in a gearing system.

A further purpose is to avoid difficulty from problems relating to center distance.

A further purpose is to produce a gearing system which is insensitive to misalignment between input and output.

A further purpose is to obtain differential motion which is insensitive to eccentricity and to tooth shape.

A further purpose is to distribute the input stresses at a different location from the output stresses in a gearing system.

A further purpose is to construct a motion transmitting device having a first ring, a second ring of different diameter from the first, coaxial therewith and having a deflectable wall, and having a strain inducing element in engagement with the second ring and maintaining the second ring deflected into mating relation with the first ring at a plurality of circumferentially spaced positions interspaced by a non-mating position, and having means for moving the strain inducing element relative to the periphery of the second ring and thereby propagating a strain wave around the periphery of the second ring and causing relative rotation of the second ring with respect to the first ring.

A further purpose is to propagate the strain wave mechanically, electrically or by other suitable means.

Further purposes appear in the specification and in the claims.

In the drawings I have chosen to illustrate a few only of the numerous embodiments in which my invention may appear, selecting the forms shown from the standpoints of convenience in illustration, satisfactory operation, and clear demonstration of the principles involved.

Figures 3, 4, 5, 6, 7, 8:
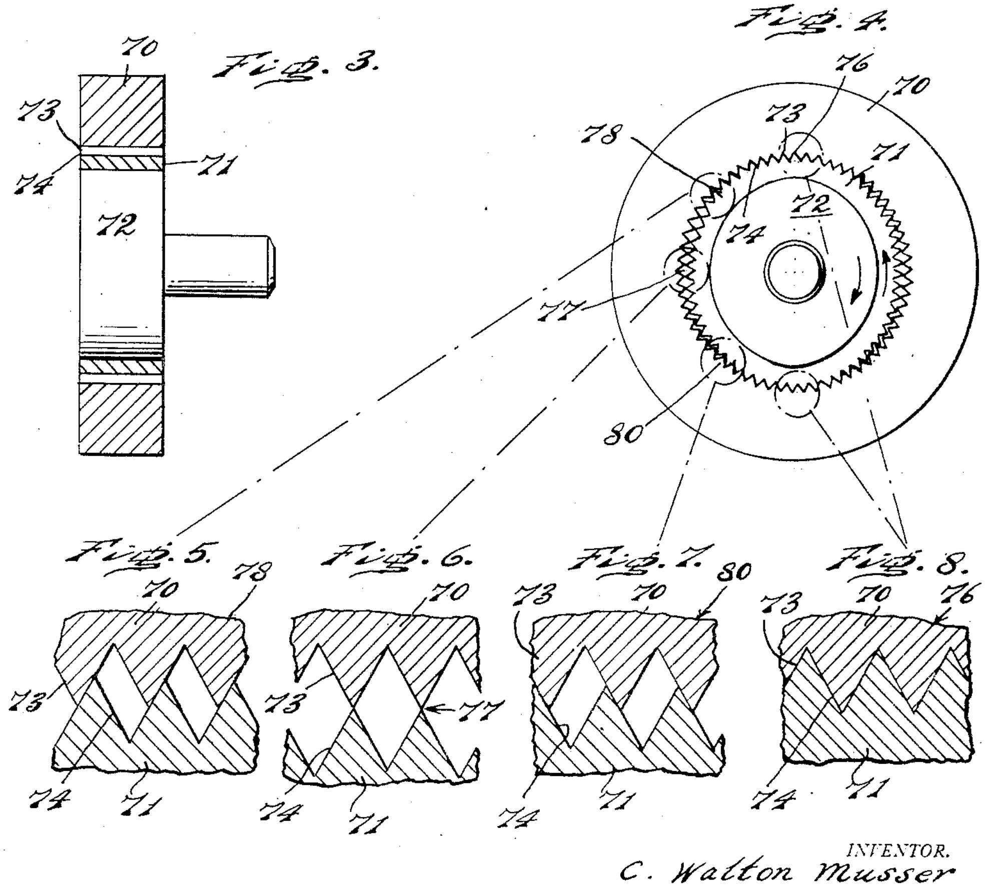
Figure 3 is an axial section corresponding generally to the exploded section of Figure 1, but showing the parts assembled in their normal operating relationship.
Figure 4 is a right end elevation of the assembly of Figure 3.

Figures 5 to 8 inclusive are enlarged developed fragmentary sections transverse to the axis showing the relative relations of the teeth at various positions in Figure 4, as indicated by the corresponding section lines.

Figure 9:
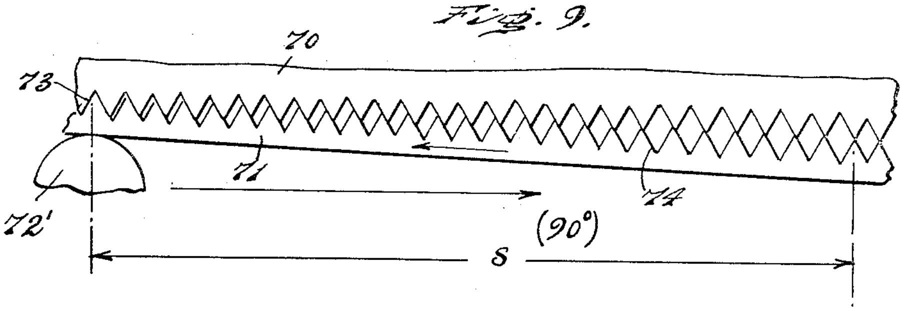
Figures 10, 11, 12:
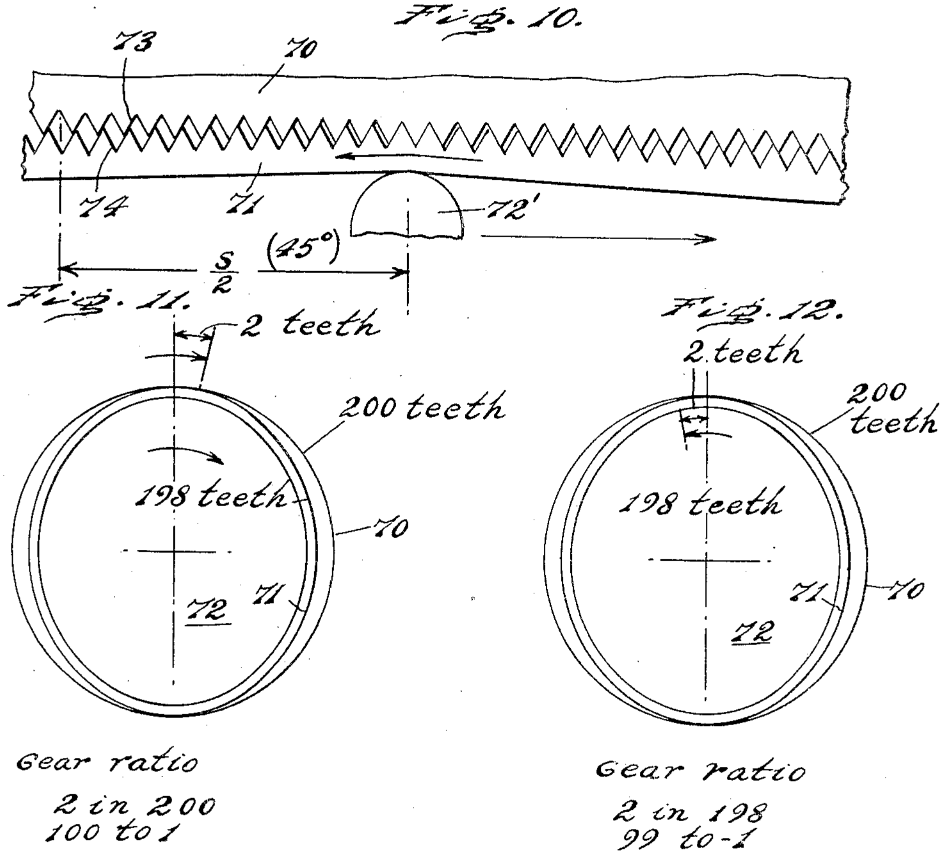

Figures 9 and 10 are enlarged developed fragmentary elevations of the relative relationships of the ring gear and strain gear at different positions of the strain inducer. These views likewise correspond with positions of rack elements which may be employed according to the invention.

Figure 11 is a diagrammatic end elevation showing the mating position where the ring gear is driven and the strain gear is stationary.

Figure 12 is a view corresponding to Figure 11, but drawn for the condition in which the ring gear is stationary and the strain gear is driven.

Figure 13:
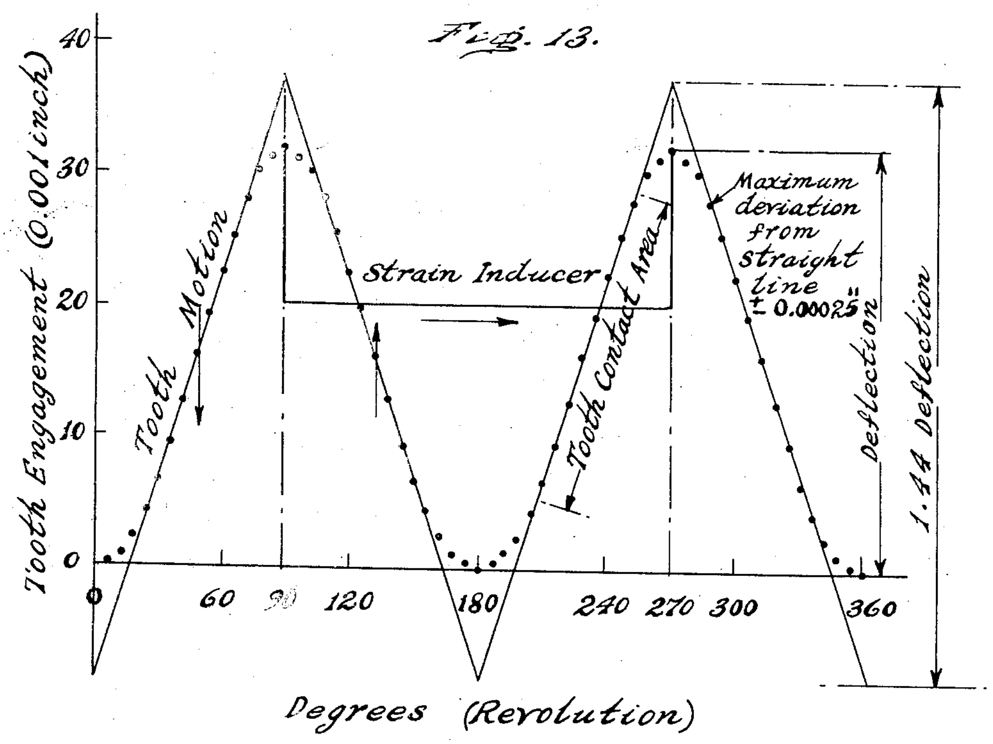

Figure 13 is a diagram showing strain wave as ordinate with respect to a developed deflection circle as the abscissa.

Figures 14A, 14B:
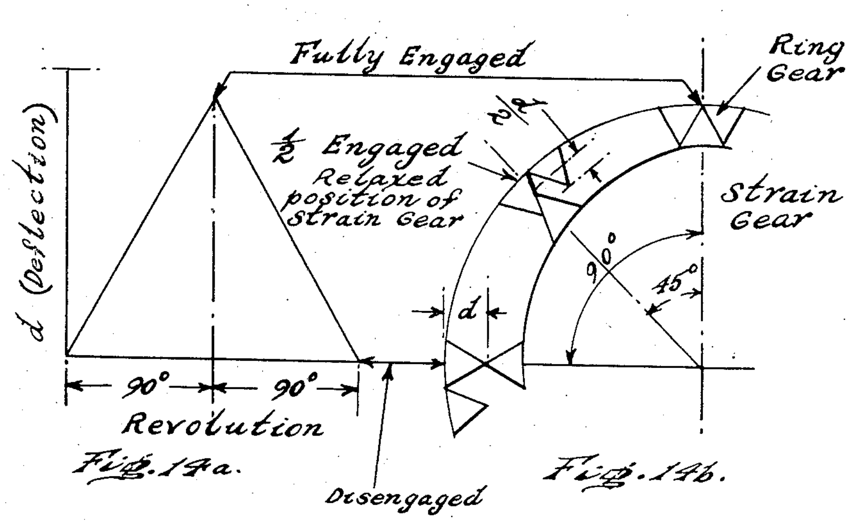

Figures 14*a* and 14*b* are a diagram which illustrates the shape of the tooth for a linear relation between deflection and revolution.

Figure 15:
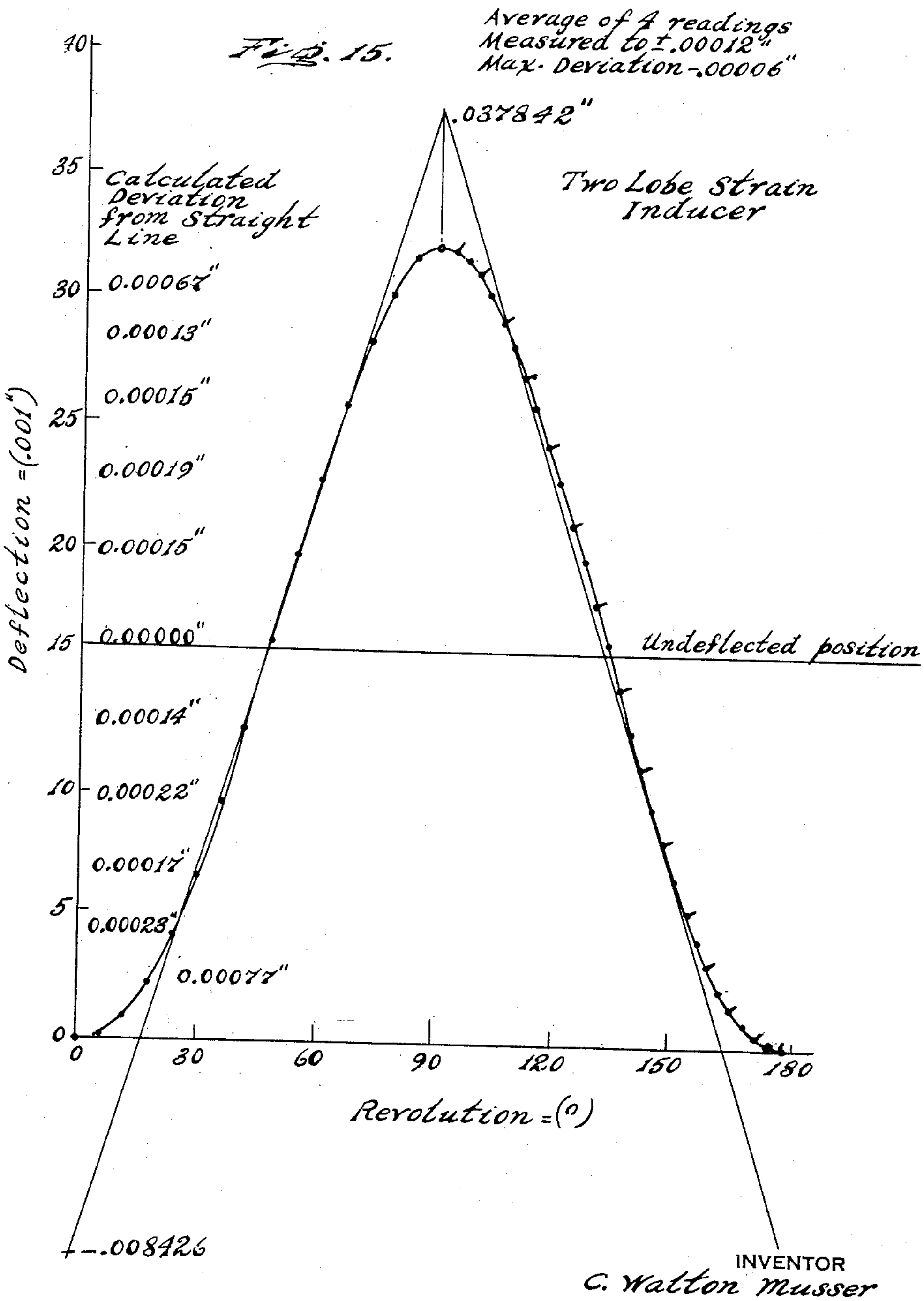

Figure 15 is a diagram plotting deflection against the advancing revolution for 180°, using a two lobe strain inducer. This illustrates particularly the linearity of deflection plotted against revolutions.

Figure 16:
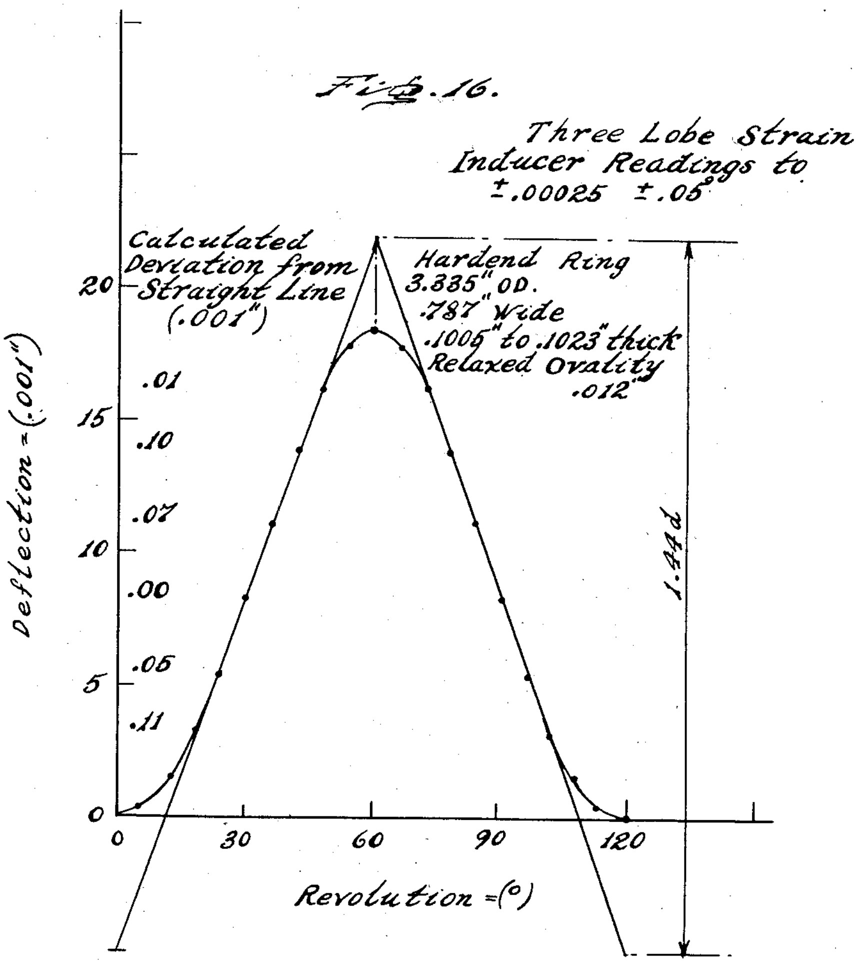

Figure 16 is a similar curve for a three lobe strain inducer, plotting deflections against revolutions over 120°. Again, the curve illustrates the linearity of the relationship.

Figures 17, 18:
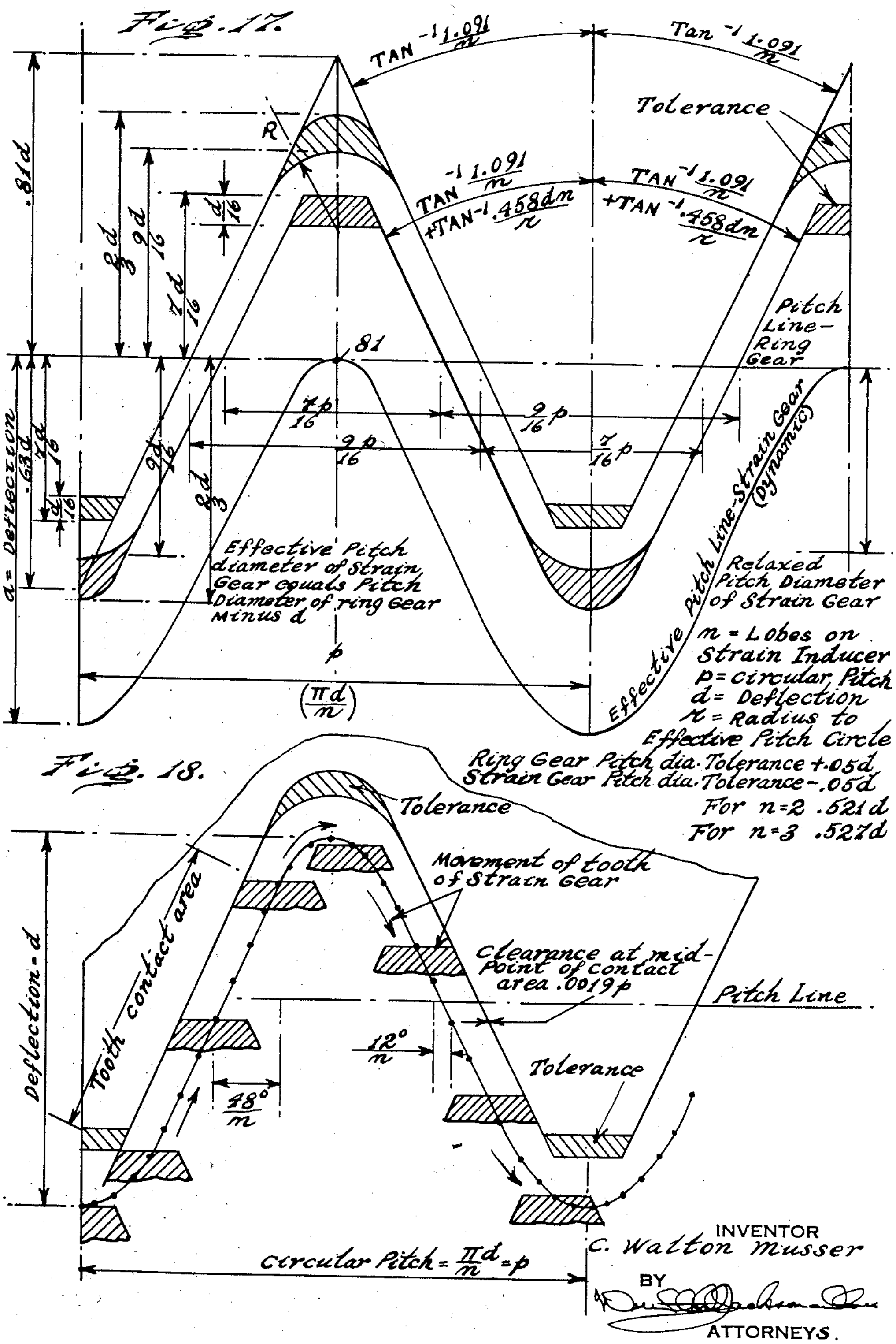

Figure 17 is a tooth profile diagram in accordance with the invention.

Figure 18 is a similar diagram showing successive tooth positions.

Figures 19 to 44 inclusive illustrate various aspects of the mechanical strain inducer and its method of production.

Figure 19 is an end elevation of a simplified form of mechanical strain inducer.

Figure 20 is an axial section of Figure 19.

Figures 21 to 24 inclusive illustrate a mechanism which may be employed in producing a suitable strain inducer contour.

Figure 21:
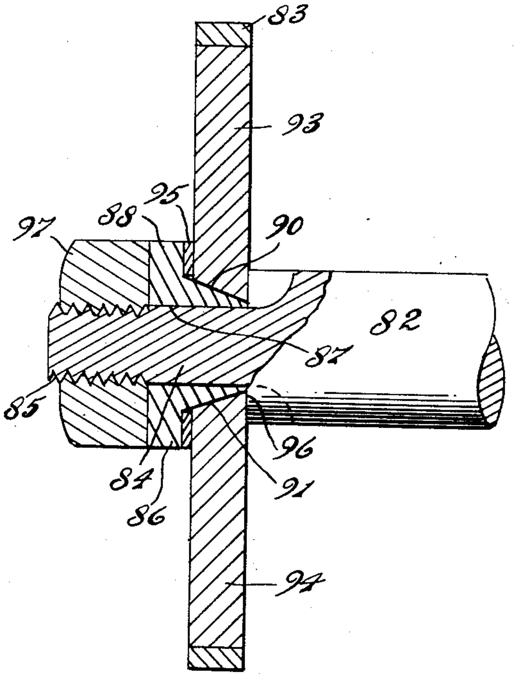

Figure 21 is an axial section showing the expansion mechanism in position to expand a ring.

Figure 22:
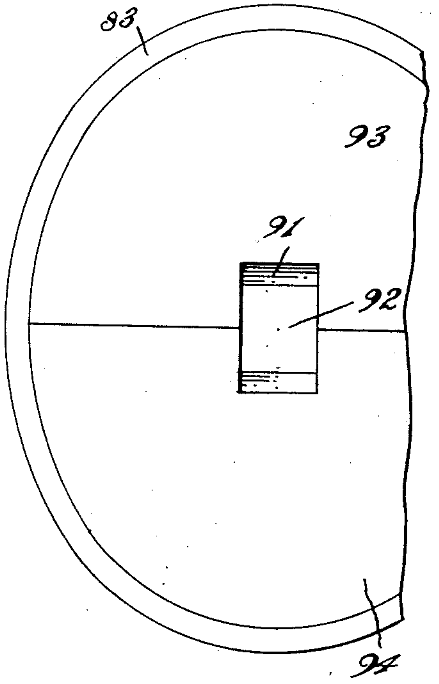

Figure 22 is a detail end elevation of the elliptical expanding segments.

Figure 23:
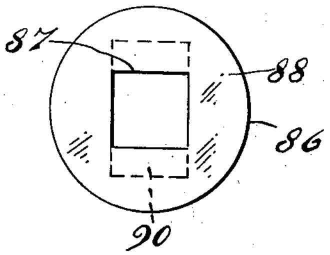

Figure 23 is a detail left end elevation of the washer shown in Figure 21.

Figure 24:
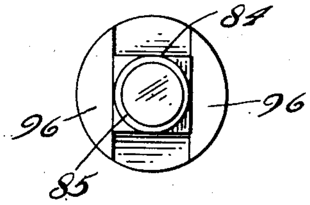

Figure 24 is an end elevation of the cam shaft of Figure 21.

Figures 25 and 26 show a modification in the mechanical strain inducer, Figure 25 being an end elevation and Figure 26 an axial section.

Figures 27 and 28 illustrate a further variation in the mechanical strain inducer, Figure 27 showing an end elevation and Figure 28 showing an axial section.

Figures 29 and 30 illustrate a still further variant of mechanical strain inducer, Figure 29 being an end elevation and Figure 30 being a side elevation.

Figures 31 and 32 show a still further form of mechanical strain inducer, Figure 31 being an end elevation and Figure 32 a fragmentary side elevation.

Figures 33 and 34 illustrate respectively in end elevation and axial section a still further form of strain inducer.

Figures 35 and 36 show respectively in end elevation and axial section a two lobe compensated ball form of strain inducer.

Figures 37 and 38 show in end elevation and axial section, respectively, a two lobe ball bearing strain inducer having an elliptical inner race.

Figures 39 to 44 inclusive respectively illustrate in fragmentary axial section various contours of races and balls or rollers, as the case may be, for antifriction bearing elements to be used in strain inducers.

Figures 51, 52, 53, 54, 55, 56:
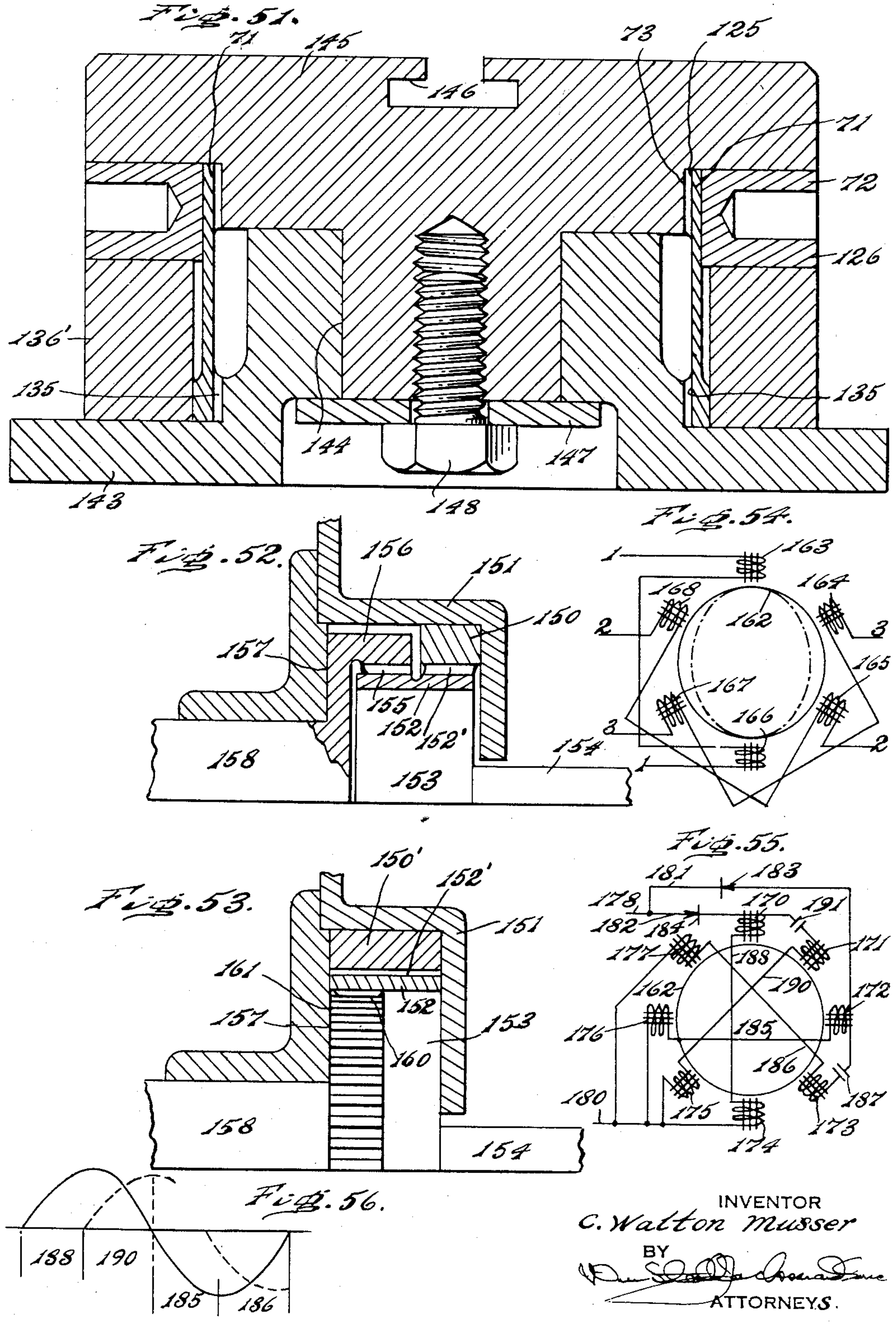

Figures 45 to 53 inclusive show in fragmentary axial sections variants in the arrangements of the components of the strain wave gearing of the invention, Figures 45 to 51 inclusive showing different forms of single gearing, and Figures 52 to 53 showing examples of dual gearing, in accordance with the invention.

Figures 54 and 55 are electrical diagrams in axial section of variations in electromagnetic strain inducers according to the invention.

Figure 56 is a phase-diagram for the circuit of Figure 55.

Describing in illustration, but not in limitation and referring to the drawings:

CONVENTIONAL GEARING

In conventional gearing, regardless of the overall shape of the gear, and of the particular tooth form, it is general to provide engagement between the respective gears of a pair only along a particular area of contact or group of adjoining teeth, the particular teeth in contact changing as the gears relatively move, but always assuring contact only in one circumferential zone of the gear. Various problems exist in such conventional gearing which provide limitations upon the utility of such gearing especially from the standpoint of precision applications, and also from the standpoint of very high gear ratios. Certain of these difficulties in conventional gearing arise from the usual point or line contact between teeth, and from the widely variant rates of relative motion of teeth during engagement, as well as from the fact that primary engagement is limited to a very few teeth in even the best conventional installations.

There are several requirements in conventional gearing which act as a limitation upon accuracy and precise transmission of motion:

(1) The tooth form must be absolutely conjugate, and if this were to be followed correctly, it would require that the teeth have an exact match in size and number.

(2) The tooth spacing must be accurate.

(3) Angle of action must be large enough to insure proper tooth contact. There is a particular difficulty here in many types of gearing because there often are insufficient teeth to assure proper contact throughout the angle of action.

(4) The pitch circle must be concentric with respect to the bearing, and this is a very difficult condition to maintain.

(5) The center distance must be accurate to maintain the pitch circles proper so that one pitch circle can roll with respect to the other pitch circle, and this is very difficult to maintain especially where the housings are not rigid or the loads are high.

There are a number of other features in which conventional gearing cause difficulty, among which can be mentioned the following:

(*a*) When teeth of conventional gearing first come in contact, there is a high pitch line velocity, and also a high sliding velocity. This greatly aggravates the lubrication problem, tending to throw off lubricant from the tooth.

(*b*) Since the initial rate of sliding when the teeth first come in contact is very high, impact effects are likely to result, causing brinelling, and causing heating of the line contact, with cracking, galling and accelerated failure.

(*c*) Individual teeth on a gear are frequently worn more rapidly than other teeth, and in some cases are not of exactly the same contour initially. This is particularly true in reversing gearing, but is also a factor in all gearing. This feature is aggravated by the fact that where impact loading is applied, an impact load may be encountered at a time when particular teeth are in engagement and are carrying the entire load.

GENERAL FEATURES OF INVENTION

The present invention is concerned with eliminating difficulties encountered in conventional gearing, as will be explained more in detail later. The present invention deals particularly with gearing of a character in which inner and outer concentric gears are brought into mating relationship in a plurality of spaced areas, with interspersed areas in which they are not in mating relationship, and the areas of mating relationship are propagated forward in a wave which for the purposes of the present invention is described as a strain wave, since it represents a wave deflection in one of the gearing elements.

This strain wave is actually superimposed on the circumference of one or both of the gears, and travels with respect to it at a rate which is determined by the rate of application of load or rotary force to the mechanism.

It should be appreciated that in the mechanism of the present invention, unlike all ordinary gearing, two cooperating gears move into and out of tooth engagement by radial motion of the teeth of one gear with respect to the other, without in the least necessitating any change in the gear axis. It will be evident, therefore, that this action presupposes a motion of parts of one of the gears with respect to other parts which can be accomplished in any suitable manner, but preferably will be achieved by deflecting an elastic material, which may be for example an elastomer such as rubber, synthetic rubber, nylon, or other plastic, or a metal such as steel, bronze, or other gear material, moving within the elastic limit, and thereby substantially free from plastic deformation.

It will, however, be understood that the principles of the invention are applicable to any suitable mechanism which applies the propagated wave inducing mating engagements according to the disclosure of the invention.

PRINCIPLES OF OPERATION

Strain wave gearing is a novel system for transmitting motion and power, in which the gear tooth engagement is induced at a plurality of points by the deflection of a thin ring gear or the like. The tooth engagement at a plurality of points around the circumference is propagated along the periphery of the thin ring gear as the crest of the induced deflection wave is made to move around this periphery. As the deflection moves around the gear, each tooth moves radially in and out of engagement as it progresses from one tooth to the next, tracing during this motion a curve which is generally of the character of a sinusoidal wave, giving rise to the term "strain wave gearing." Such a wave is illustrated in Figure 13.

Figure 1:
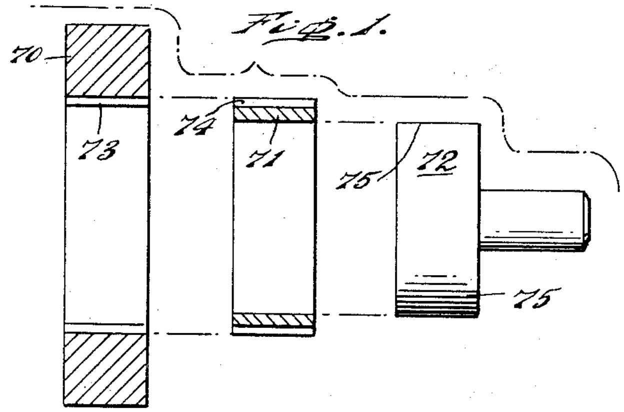
Figure 1 is an exploded axial section of a device for transmitting motion according to the present invention, in a simplified form.
Figure 2:
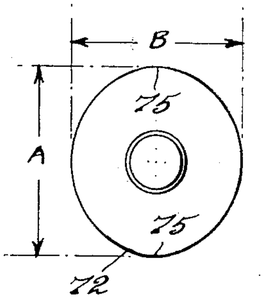
Figure 2 is a right end elevation of the strain inducer shown in Figure 1.

In the simplest form as shown for example in Figures 1 to 10 inclusive, the motion transmitting device consists of a ring gear 70, a strain gear 71, and a strain inducer 72. The ring gear has internal teeth 73 in the illustration shown, which are preferably of axially extending character. In this form the strain gear 71 has external teeth 74 which also preferably extend axially and at the same diametral pitch as the teeth on the ring gear but have a slightly smaller pitch diameter. This difference in pitch diameter is caused by the fact that the number of teeth in this case on the strain gear is less than the number of teeth on the ring gear. The difference in the number of teeth between the two gears, or the tooth differential, should be equal to or a multiple of the number of places at which the strain gear is deflected to cause tooth engagement with the ring gear. This differential would desirably be two, using a strain inducer having an elliptical contour with two lobes 75, as shown in Figures 1 and 2. As already explained, the strain gear 71 is made of a material which is elastic under the conditions of operation, and in the case of a steel strain gear, is made of relatively thin cross section so that it can be deflected easily in a radial direction.

The form of strain inducer for transmitting motion as illustrated in Figures 1 to 10 is a very simple one having two points of strain engagement of the strain gear. The strain inducer 72 has an elliptical contour, as already explained, whose major axis A is larger than the inside diameter of the strain gear 71 by an amount approximately equal to the difference in pitch diameter of the ring gear and the strain gear. The minor axis B is smaller than the inside diameter of the strain gear by approximately the same amount. When the strain inducer is inserted into a position inside the strain gear, as shown in Figure 3, it causes the strain gear to be distorted into elliptical form, with the distance from the gear axis to the pitch line of the teeth at the major axis equal to the pitch diameter of the ring gear as shown at 76 in Figures 4 and 8. At the position as shown in Figure 8 the pitch circles of the two gears are coincident. At the minor axis the distance of the pitch line of the strain gear teeth from the gear axis is less than the pitch diameter of the ring gear, and if a full tooth height is used, the teeth will just clear one another as shown at 77 in Figures 4 and 6. At intermediate points 78 and 80 as shown in Figures 4, 5 and 7, the teeth will have varying degrees of engagement. This condition prevails where the tooth differential is equal to the number of lobes on the strain inducer which in this case is two.

The relationship between the respective teeth can be better understood by studying the developed view of the tooth engagement in Figures 9 and 10. In the developed form, it would be necessary to have the teeth of the strain gear slightly different in pitch from those of the ring gear and in the example shown the teeth on the strain gear are slightly larger. It will be understood, however, that in the circular form the pitch of the teeth of the strain gear and the ring gear is identical, and a similar relation is obtained in the developed view, since, for circular motion, the motion is measured in degrees or radians, and the internal strain gear has fewer teeth per degree or per radian than the outer ring gear.

To further emphasize the illustrations in Figures 9 and 10, the strain inducer 72' is shown as having line contact instead of contact along an inclined plane or cam surface. In Figure 9 the distance between the point where the teeth of the ring gear and the strain gear are fully meshed at the strain inducer and the point where they are fully out of mesh has been designated as S. This is one-half the angular distance between the lobes on the strain inducer, or, for a two lobe system, 90°, the angular distance between the positions of Figures 8 and 6.

As the strain inducer 72' is moved to the right in the direction of the arrow in Figure 9 toward the position shown in Figure 10, the teeth of the strain gear gradually move into engagement ahead of the strain inducer and out of engagement behind the strain inducer. At the strain inducer they are always fully meshed. When the strain inducer has moved to the position shown in Figure 10, a distance of one-half S or 45°, the strain gear has moved to the left in relation to the ring gear a distance of one fourth tooth. For a full 360° motion or one revolution, the strain gear will move $$\frac{360}{45} \times \frac{1}{4} = 2 \text{ teeth}$$

One complete revolution of the strain wave around the periphery of the strain gear will always produce a tooth movement which is equal to the difference in the number of teeth between ring gear and the strain gear. In this analysis it has been assumed that wave shape is a linear function of revolution.

Figures 11 and 12 illustrate the relative motions with respect to the elements shown. In each of these figures it is assumed that the ring gear 70 has 200 teeth and the strain gear 71 has 198 teeth. An elliptical strain inducer 72 having two lobes is used as a driver. In the form of Figure 11, the ring gear 70 is the driven gear and the strain gear is stationary. From the motion shown in Figure 10, it will be evident that the strain gear when driven always moves in the opposite direction to the movement of the strain inducer. Hence, with the strain gear stationary, the ring gear will move in the same direction as the strain inducer. Stated generally, the principle is that the gear that has the largest number of teeth per degree or per inch moves in the same direction as the strain inducer where the strain inducer is the driving element.

It will be seen from an analysis of Figures 9 and 10 that the tooth movement is equal to the difference in the number of teeth between the ring gear and the strain gear, in this case two teeth per revolution of the strain inducer. Since there are 200 teeth in the ring gear and it only moves two teeth per revolution of the strain inducer, it would require 100 revolutions of the strain inducer to produce one revolution of the ring gear, therefore the gear ratio of input to output is 100 to 1.

If now we apply a similar analysis to Figure 12 it will be evident that here the strain gear 71 moves two teeth per revolution of the strain inducer 72. However, in the case of Figure 12, there are two important differences, first, the direction is opposite to the motion of the strain inducer, and secondly, it moves the same distance, that is, two teeth, but in a smaller total number of teeth, that is, 198. Therefore, for Figure 12 the gear ratio is 198 to 2 or 99 to −1 (since it is in the opposite direction the 1 is negative).

In the analysis so far, it has been assumed that the strain inducer is the driving element. Since, however, strain wave gearing can be made to have a relatively high mechanical efficiency, any of the three elements can be utilized as the driving element with either of the remaining elements as the driven element. For example, in Figure 11 the strain gear may be stationary, with the ring gear the driver, and the strain inducer driven. When used in this manner, the driven strain inducer makes 100 revolutions for every revolution of the driving ring gear.

While we have in this initial simplified analysis assumed a condition in which the strain inducer is internal and the strain gear is located outside the strain inducer and inside the ring gear, it will be evident as later explained that these features can be reversed, for example placing the strain inducer on the outside, and the strain gear inside it, and the ring gear on the very inside.

The gear ratio is the function of the difference in the diameter of the two gears and is entirely independent of the tooth size since the number of teeth in each gear is directly related to their pitch diameters. The teeth, therefore, could be made of infinitesimal size, or in fact there may be no teeth at all, with merely frictional contact engagement, and the gear ratio will not be affected in the least by any such change in construction. The number of complete strain wave revolutions around the strain gear for one revolution of the output element is equal to the difference in pitch diameter of the two gears divided into the pitch diameter of the driven element. For example, let us assume that the numbers as indicated in Figure 11 constitute one hundredths of an inch instead of teeth. Then the ring gear would have a circumference of 2.00 inches and the strain gear would have a circumference of 1.98 inches. The number of turns that the driver or strain inducer would turn to produce one revolution of the ring gear would then be:

$$\frac{2.00}{2.00-1.98}=\frac{2.00}{0.02}=\frac{100}{1}$$

ANALYSIS OF WAVE AND TOOTH FORM

The tooth size, shape and tooth differential, greatly influence the percentage of teeth which are in engagement. If the teeth on the ring gear are proportioned so that their height is equal to the deflection and their included angle is properly chosen, the sharp pointed tooth on the strain gear would at all times be in contact with the mating tooth on the ring gear. Under these conditions, it would be possible to have 100 percent of the teeth in contact at all times, all of the teeth in varying degrees of mesh. If the height of the teeth is decreased to less than the deflection or if the included angle is changed, the percentage of teeth in contact is decreased. It is therefore very easy to manufacture a tooth configuration which has a percentage of teeth in contact in the range from 45 to 55 percent, and strain wave gearing is therefore very unusual in having in many cases more than 50 percent of the teeth in contact at all times.

Preliminary to the development of the proportions and included angle for the teeth, it is necessary to determine the strain wave shape. Table 1 lists data determined experimentally and used in plotting the strain wave in Figures 13, 15, 17 and 18. The data in Table 1 were determined with extreme care. A hardened, tempered, and ground steel ring consisting of a bearing steel alloy, SAE 52100, having an inside diameter of 1.9685 inches concentric with an outside diameter of 2.3810 inches within measurable limits of plus and minus 0.0001 inch was deflected over two bars each having a radius of 0.4375 inch. The two bars were located at diametrally opposite points on parallel centers inside the ring. The ring was centered on a dividing head with a 35 power microscope determining the actual rotative position of the table itself which was graudated in 0.150 degrees. Radial measurements or measurements of the height of the wave were read at 6 power magnification on a dial indicator having graduations of 0.0005 inch to the closest 0.00012 inch. Each wave was measured on both sides of the wave crest. The readings from the two sides of the same wave were averaged to correct for the slight lack of phase relationship with the rotary readings. These data are tabulated in Table 1. Data obtained from other rings of entirely different proportions and under different deflection loads indicate that this curve, at least for the degree of strain which is important in strain wave gearing, is the same regardless of proportions or deflections. This agrees with strain data obtained from the literature on proof rings.

*Table 1*

[360° measurement of 2.3810″ ring strained elliptic to 2.4145″ max. and 2.3502″ min. Readings on opposite sides of each crest have been averaged. Accuracy of readings ±.00012″±.03°]

| Wave No. 1 deflection per 6° (.001″) | Wave No. 2 deflection per 6° (.001″) | Average deflection per 6° (.001″) | Deflection/6° for 28.6 =3.0846 (.001″) | Difference × sin 28.6° (.001″) |
|---|---|---|---|---|
| 0.00 | 0.00 | 0.00 | −8.426 | ---------- |
| 0.18 | 0.18 | 0.18 | −5.342 | ---------- |
| 1.00 | 1.00 | 1.00 | −2.258 | ---------- |
| 2.43 | 2.43 | 2.43 | 0.827 | 0.77 |
| 4.37 | 4.43 | 4.40 | 3.912 | Tooth Contact Area 0.23 |
| 6.62 | 6.68 | 6.65 | 6.996 | 0.17 |
| 9.56 | 9.68 | 9.62 | 10.081 | 0.22 |
| 12.87 | 12.87 | 12.87 | 13.165 | 0.14 |
| 16.25 | 16.25 | 16.25 | 16.250 | 0.00 |
| 19.62 | 19.68 | 19.65 | 19.335 | 0.15 |
| 22.75 | 22.87 | 22.81 | 22.419 | 0.19 |
| 25.75 | 25.87 | 25.81 | 25.504 | 0.15 |
| 28.25 | 28.37 | 28.31 | 28.588 | 0.13 |
| 30.31 | 30.25 | 30.28 | 31.673 | 0.67 |
| 31.68 | 31.68 | 31.68 | 34.757 | ---------- |
| 32.12 | 32.12 | 32.12 | 37.842 | ---------- |

Figure 13 plots a curve for a strain gear having a two lobe strain inducer. There are therefore two complete waves in 360° or one complete revolution. The ordinate is tooth engagement in 0.001 inch and the abscissa is degrees in the revolution. The height of the wave is equal to the total deflection. This is referred to as tooth engagement because it is this up and down or actually radial in and out motion that produces tooth engagement and disengagement in circular strain wave gearing. Straight lines are superimposed on the two sides of the wave to obtain the closest possible match over as great a percentage of the distance as possible. When the height of the triangle formed in this manner is 1.44 times greater than the deflection, the match over more than 50% of the curve is within ±0.00025 inch. This is explained in detail in reference to Figure 15 and Table 1.

The dots shown in Figure 13 on the strain wave are plotted from actual data measured from a strained ring. These dots also show the progressive movement of the teeth on a strain gear with movement of the strain inducer. This wave of course is purposely exaggerated in height to properly illustrate the wave shape and facilitate accurate plotting. If the degrees (revolution) were shown to the same scale as the deflection, the wave would be approximately 125 times as long as illustrated. This wave at any instant is superimposed on the circumference of a circle, and height of the total wave or the deflection is approximately twice the radial displacement of the peaks of the wave from this circle. If it were plotted in this manner, the deflection for that portion of the wave having a greater radial distance from the center than the circumference would be given as "plus" strain. The other portion of the wave having a lesser radial distance would be given as "minus" strain. The position before strain (or the circumference of the relaxed ring) is indicated in Figure 15 as the "undeflected position." However, it will be evident that measurement of the wave and all of the calculations are simplified by considering the total deflection as being measured from a base line coincident with that portion of the wave which has the least radial distance from the center.

It will be evident upon analysis that the shape of the wave drawn to a base line equal in length to the circular pitch, that is, the distance from one tooth to the next, will accurately outline the tooth form. When drawn to these proportions the wave looks essentially as shown in Figure 13, with the abscissa equal to the circular pitch for two teeth. In order to illustrate this relationship, the deflection wave shown in Figure 14*a* is represented as a linear function of revolution. The deflection is made exactly equal to the tooth height as shown in Figure 14*b*. Thus it will be seen that a 90° revolution of a two lobe strain inducer in strain wave gearing produced according to these proportions will cause a change in radial deflection equal to the tooth height for the teeth that were either fully engaged or fully disengaged.

For properly shaped teeth, 100% of the teeth under this condition would be in contact, but in various degrees of engagement. Proceeding from the base line in Figures 14*a* and 14*b*, or from the disengaged position, one side of the teeth on the strain gear will become progressively more engaged with one side of the teeth on the ring gear as the apex of the curve is approached. At the point of 45° revolution, the teeth will be engaged 50% or deflection/2. At 90° revolution they will be fully engaged. Proceeding beyond 90°, the teeth will become progressively less engaged on the next 90° revolution. Here, however, the opposite side of the tooth is in contact. It is an unusual feature of the gearing of the present invention that for the same direction of drive successively opposite sides of the same tooth engage as the teeth advance.

Hence for 90° revolution the phase relationship of the teeth changes 180° or it is one-half tooth out of phase. This accordingly indicates that the teeth, for this shape of strain wave, should be equal in height to the deflection and have a base line equal to the out-of-phase relationship for 180° revolution. The included angle is determined by this relationship. The sides of this angle are straight since the deflection chosen has a linear relationship with revolution. Consequently the curve of Figure 14*a* is fully representative of tooth form if the abscissa is equal to the circular pitch of one tooth.

From Figure 14 it is possible to produce a generalized formula for circular pitch for use in strain wave gearing calculations. The nomenclature as applied to this calculation and as appearing on Figure 14 is as follows:

$d$=total deflection—difference in pitch diameters $D_R$=pitch diameter of ring gear $D_E$=pitch diameter of strain gear $p$=circular pitch $n$=number of lobes on strain inducer $N_R$=number of teeth on ring gear $N_E$=number of teeth on strain gear $$d=D_R-D_E$$

$$D_R=\frac{N_R p}{\pi}$$

$$D_E=\frac{N_E p}{\pi}$$

$$n=N_R-N_E$$

Then $$d=\frac{N_R p}{\pi}-\frac{N_E p}{\pi}$$

therefore the circular pitch formula for strain wave gearing is $$p=\frac{\pi d}{n}$$

Here the circular pitch is reduced to a definite relationship with deflection and number of lobes on the strain inducer. As a result, the tooth form is dependent only upon the number of lobes on the strain inducer. In producing Figure 14, it was assumed that the curve is a linear function of revolution. This, of course, is not strictly true for a natural strain wave. In order to ascertain the degree of linearity obtainable with a strain wave, measurements of an actual wave were carefully taken as outlined above and as tabulated in Table I. In this table, the first column shows the measurements obtained from one of the waves and the second column shows the measurements obtained from the opposite or other wave. In the third column these have been averaged and these data are used to determine linearity of the portion of the strain wave. These data were also used to plot the curves of Figures 13, 15, 17 and 18. The maximum deviation of any reading from this average was 0.00006 inch.

The fourth column of Table 1 shows the deflection or ordinate position of a 28.6° line for each 6° revolution of the abscissa. The ratio of the ordinate to the abscissa was calculated as follows:

$$6° \text{ Abscissa}=\frac{p}{2}/\text{Divisions}\times \text{COT } 28.6° \text{ in abscissa}$$

$$=\frac{\pi d''}{2n}\Big/\frac{360°}{2n\times 6°}\times 1.83413$$

$$=.0030846'' \text{ ordinate}$$

The 28.6° line was chosen as the closest match with the desired objective of having 50 percent of the teeth in contact at the center of tooth tolerance. This also simplifies the tooth form and calculation. It matches the side of the 1.44$d$ triangle to within 0.0000011 inch per abscissa division of 6°.

The point on Table 1 which corresponds numerically to 16.25 was made coincident for purposes of comparison. This point is approximately the center of the tooth contact area. The differences between the deflection for the curve in the third column and the straight line in column 4 was multiplied by the sine of 28.6° to determine the actual distance between these two points. These distances were tabulated in the fifth column. As indicated here, linearity has been achieved within a quarter of a thousandth of an inch. Preliminary calculation indicates that this quarter of a thousandth of an inch can be fully absorbed under applied load by the minute deflection of all associated parts without increasing the stress at the maximum stress point. Hence the tooth can be made with straight sides over the tooth contact area as in the discussion with respect to Figure 14. Formula 2 will then apply to circular pitch of the teeth and the angle of the side, or the pressure angle, will be a function of this pitch and the deflection in the following manner:

$$\text{Pressure angle} = \tan^{-1}\frac{\pi d}{2n}/1.44d$$

$$= \tan^{-1}\frac{\pi}{2.88n}$$

$$= \tan^{-1}\frac{1.091}{n}$$

Figure 15 indicates these results graphically, plotting deflection against revolutions in degrees. This plots the experimental data with the 1.44$d$ triangle superimposed.

While it is true that strain calculations made from proving rings indicate that the form of the strain wave is independent of ring dimension, vertification of this feature was obtained by measuring another ring of entirely different proportions, which, when compared with the ring previously measured are as follows:

| | | |
|---|---|---|
| Outside diameter | percent | 140 |
| Inside diameter | do | 160 |
| Thickness | do | 49 |
| Deflection | do | 200 |
| Deflecting arbor radius | do | 35 |
| Relaxed ovality | inch | .012 |
| Variation in wall thickness | do | .0018 |

As might be expected, the uniformity of the wave for this ring was not as good as for the more nearly perfect ring from which the data in Table 1 where plotted. It should be noted, however, that throughout the tooth contact area the linearity was excellent, averaging 0.0001 inch with a maximum of 0.0003 inch. At no place in the entire wave did the two waves differ by more than 0.0004 inch. To illustrate this match, alternate dots marked with a light stroke on the right hand portion of the wave of Figure 15 have been plotted from this latter ring. It would appear from the experimental data obtained from these two dissimilar rings that there is a strong indication that the wave form within the range used in strain wave gearing is independent of ring dimension or deflection.

In order to determine if the number of lobes on the strain inducer would cause an alteration in the wave shape, a ring was radially distorted at three 120° points and measured. The results of these measurements are plotted in Figure 16, the plotting deflection against revolutions in degrees. A line was superimposed over its curve in accordance with Formula 3, which for the three lobe strain inducer has a pressure angle of 20°. Deviation of the curve from this straight line was then calculated in the same manner as was done above for the two lobe system. The results are shown on Figure 16 for the tooth contact area. It should be noted that there are fewer points on the three lobe curve than on the two lobe curve. This is due to the fact that the three lobe curve has a curve length of 360°/3 while the two lobe has a curve length of 360°/2. The divisions in both cases are 6°.

On Figure 17 the same data are resolved into a practical tooth form. The teeth on both gears have been made identical except for the angle. The pressure angle on the strain gear has been increased to compensate for the angularity of the strain wave with the pitch circle circumference during tooth contact. To correct for the slight change in angle caused by the tooth being on an arc, the pressure angle of the ring gear is given for the tooth and the pressure angle for the strain gear is given for the space between teeth. Fortunately, the shape of the strain wave permits provisions for more than adequate fillets, clearances, and tolerances without materially reducing the theoretical maximum tooth bearing area. This bearing area is the portion of the curve that coincides within manufacturable limits with a straight line. Since the height of the triangle which has sides in coincidence with this curve is 1.44$d$ and since the coincidence portion is about 0.77$d$, approximately 46% of the triangle height can be used for fillets, clearances and partially for tolerances.

The pitch line for the ring gear is represented as a straight line. The effective pitch line of the strain gear varies radially from the center as the strain inducer is rotated. Coincidence between the pitch line of the ring gear and the strain gear occurs only at the extreme top or crest of the strain wave. The center of a tooth on the strain gear at the pitch line shown by a heavy dot will move radially in and out as the strain inducer moves the wave at the tooth. After the strain inducer has moved 360°/2$n$, the center of the tooth shown will have been displaced radially toward the center by the distance equal to the deflection.

By analysis of Figure 14 it has been determined that the shape of the strain wave also describes the theoretical tooth shape. While these waves are the same in form, they are of an entirely different scale. By representing the wave length as being equal to the circular pitch, it is easier to visualize tooth relationship. In Figure 18, plotting deflection against circular pitch, the center of the line of a tooth is moved along such a wave to illustrate the relative position of mating teeth throughout their travel. It must be remembered, however, that a rotational tooth movement equal to "circular pitch" requires a rotation of the strain inducer of 360°/$n$. The rotational increment of the strain inducer for the tooth positions shown in Figure 18 is 48°/$n$.

For the purpose of the discussion herein, it has been assumed that the flexible or strain gear rotates (or remains rotatatively stationary) as a unit and that all parts of this gear are in constant angular relation with all other portions thereof. More rigorous treatment demonstrates that rotation of the radial deflection of a ring causes a small circumferential shift of portions of the ring which causes angular motion of one part of the ring periphery relative to another part. Introducing such rigorous treatment herein is to be avoided as it needlessly complicates the analysis. The consequences of this circumferential shift tends to enhance all features outlined herein. Specifically the tooth engagement is moved around toward the point of maximum deflection so that the engaged teeth are further in mesh, the tooth sliding is markedly reduced, increasing maximum efficiency, the tooth width at the pitch line is increased and the tooth pressure angle becomes considerably less critical.

Figures 17 and 18 also illustrate that at the crest of the wave, when the two pitch lines are coincident, the teeth are fully in mesh but they are not in contact with each other. This will be evident by considering the relationship of the fully engaged teeth in Figure 17. The space on each side of the strain gear tooth is not clearance but is the space necessary for the teeth on the strain gear to travel along the wave from one side of the tooth space to the other side. While travelling a distance equal to the circular pitch, a tooth on the strain gear progressively goes through the following cycle:

(1) 13 percent travelling from the adjacent tooth space to the tooth contact area of the tooth space it is entering.

(2) 27.5 percent travelling along the tooth space area on the entering side of the tooth space.

(3) 19 percent travelling from the tooth contact area on the entering side of the tooth space to the tooth contact area on the exiting side.

(4) 27.5 percent travelling along the tooth contact area on the exiting side of the tooth space.

(5) 13 percent travelling from the exiting side of the tooth contact area to the dividing line with the next tooth space that it is entering.

Since the tooth is not in contact at the crest of the wave, backlash is easily controllable by providing a means of adjusting deflection. It is quite possible in accordance with the invention to produce a construction having zero backlash. Also, this cycle of operation tends to pump lubricant to the working surfaces.

The pitch line of the strain gear in relation to the tooth is always the same but the pitch line in reference to the center of the gear varies in accordance to its position on the strain wave. While the strain gear is in the strained condtion this pitch line is at all times coincident with the strain wave. It is from this effective pitch line that all calculations are made with the exception of the dimensions to the tooth in the relaxed or unstrained condition. Inducing the wave into the strain gear tends to stretch or increase the periphery of the ring. Hence the relaxed pitch diameter does not equal the pitch diameter of the ring gear minus deflection. It is slightly smaller than this. For the two lobe strain inducer, the relaxed pitch diameter is smaller by $0.0416d$. For practical considerations, the amount of difference can advantageously be utilized as the tolerance to be added to the ring gear pitch diameter and subtracted from the effective strain gear pitch diameter. Then gears made to the center of the tolerance limits will be theoretically correct.

Gears which are made to the basic dimensions of Figure 17 will have 55 percent of their teeth in contact—one-half of these on the tooth contact area of one side of the teeth and the other half on the other side of the teeth. Since these teeth are actually opposing each other, the gear can be made completely without backlash. Also, 27.5 percent of the teeth are actively load bearing when acted upon by a torque.

When the pitch line of the strain gear is coincident with the pitch line of the ring gear at the crest of the strain wave and the teeth are made to the basic dimensions shown in Figure 17, the rotative clearance between the tooth on the strain gear and the tooth space in the ring gear at the approximate center of the tooth contact area is $0.0019p$. For a tooth having a circular pitch of 0.0525 inch, the clearance would be 0.0001 inch. The fractional dimensions listed on Figure 17 are not to be construed as approximations but are accurate to at least four decimal places.

*Table 2*

RELATIONS $a$—Addendum$=\frac{7}{16}d=\frac{7n}{16P}=.139np$ $b$—Dedendum$=\frac{9}{16}d=\frac{9n}{16P}=.179np$ $c$—Clearance$=\frac{d}{8}=\frac{n}{8P}=.04np$ $C$—Contact ratio=percent of teeth in contract=45 To 55

$d$—Height of strain wave=total radial deflection $=\frac{n}{P}=\frac{np}{\pi}=\frac{D_D}{R}=D_R-D_E$ $D$—Pitch diameter$=\frac{Nd}{n}=\frac{N}{P}=\frac{Np}{\pi}$ $D_R$—Pitch diameter of ring gear $=\frac{Nd}{n}=\frac{N}{P}=\frac{Np}{\pi}=D_E+d=D_I+\frac{7}{8}d$ $D_E$—Effective or dynamic pitch diameter of strain gear $=\frac{Nd}{n}=\frac{N}{P}=\frac{Np}{\pi}=D_R-d=D_0-\frac{7}{8}d$ $D_S$—Relaxed or static pitch diameter of strain gear $=D_E-.0416d$ when $n=2$, $-.055d$ when $n=3$ $D_D$—Pitch diameter of driven gear$=\frac{N_Dd}{n}=\frac{N_D}{P}=\frac{N_Dp}{\pi}$ $D_F$—Pitch diameter of fixed gear$=\frac{N_Fd}{n}=\frac{N_F}{P}=\frac{N_Fp}{\pi}$ $D_I$—Inside diameter $=\frac{N_d}{n}-\frac{7}{8}d=\frac{N}{P}-\frac{7}{8}d=\frac{Np}{\pi}-\frac{7}{8}d=D_R-\frac{7}{8}d$ $D_O$—Outside diameter $=\frac{Nd}{n}+\frac{7}{8}d=\frac{N}{P}+\frac{7}{8}d=\frac{Np}{\pi}+\frac{7}{8}d=D_E+\frac{7}{8}d$ $n$—Number of lobes on strain inducer=number of places of tooth engagement$=Pd=\frac{\pi d}{p}=\frac{dN}{D}$ $N$—Number of teeth$=\frac{Dn}{d}=DP=\frac{\pi D}{p}$ $N_D$—Number of teeth in driven gear $=\frac{D_Dn}{d}=D_DP=\frac{\pi D_D}{p}=nR$ $N_F$—Number of teeth in fixed gear$=\frac{D_Fn}{d}=D_FP=\frac{\pi D_F}{p}$ $p$—Circular pitch$=\frac{\pi d}{n}=\frac{\pi}{P}=\frac{\pi D}{n}$ $P$—Diametral pitch$=\frac{n}{d}=\frac{\pi}{p}=\frac{N}{D}=\frac{7n}{16a}=\frac{9n}{16b}$ $R$—Gear Ratio $=\frac{D_D}{d}=\frac{PD_D}{n}=\frac{\pi D_D}{pn}=\frac{N_D}{n}=\frac{D_D}{D_D-D_F}=\frac{N_D}{N_D-N_F}$ $t$—Thickness of tooth at pitch line$=\frac{11d}{8n}=\frac{11}{8P}=\frac{7}{16}p$ $W$—Working depth (tooth contact area) $=.77d$ (active profile $.77d/\cos\phi$)

$\phi$—Pressure angle, ring gear$=\tan^{-1}\frac{1.091}{n}$ $\phi_s$—Pressure angle, strain gear $=\tan^{-1}\frac{1.091}{n}+\tan^{-1}\frac{.458dn}{r}$

BASIC RELATIONS

Table 2 shows the relationship of various parameters which are important in connection with the calculation of strain wave gearing. Whenever desirable these have been expressed in terms of deflection, diametral pitch and circular pitch. Many additional expressions can be derived from these data.

Many of these terms are common with standard gear terminology. In many instances, however, there are new terms or new definitions necessary when these terms are applied to strain wave gearing. Contact ratio for strain wave gearing is designated by "C" and expressed as the percentage of total teeth in contact. This is the quotient of the number of teeth which are in actual contact with mating teeth (considering both gears) divided by the total number of teeth in both gears. Where strain wave gearing are designed according to the preferred form in accordance with the present invention, the contact ratio will be 55 percent, and with minimum tooth tolerances, 45 percent. Deflection "$d$" is a new term applicable only in strain wave gearing. It is the dimension of the height of the strain wave in the strain gear equal to the difference in (1) the radial distance from the center to the crest of the wave and (2) the radial distance from the center to the base of the wave.

The deflection in the strain gear introduces another new term $D_E$. This is the effective working diameter of the strain gear which is equal to the pitch diameter of the ring gear minus deflection. Representing this as a diameter may not be strictly accurate since the strain wave has altered the circumference to either an elliptic or slightly triangular configuration. However, if we consider it as the diameter of a circle on which the strain wave center is superimposed, it will greatly facilitate calculation. When the strain gear is manufactured, or when it is not assembled into a complete gearing unit, the pitch diameter in this relaxed form is smaller than the effective or working pitch diameter by a slight amount. This relaxed diameter is designated $D_S$. In practice this difference is included on the strain gear drawing as negative tolerance to the effective pitch diameter. An equivalent positive tolerance would be given to the pitch diameter of the ring gear. Accordingly, gears made to the center of the tolerances would be theretically correct.

The subscripts D and F applied to D and N are required for the determination of the gear ratio. The designation for gear ratio has been changed from the customary $m_G$ to R since the standard means of determining gear ratio does not applied.

Throughout this description of strain wave gearing it has been assumed that $n$ was equal to the difference in the number of teeth in the two gears and the tooth relations were developed accordingly. While this relationship is not mandatory, many of the advantages of strain wave gearing are sacrificed by having the tooth difference a multiple of $n$ without deriving any compensating advantages in most cases.

There is a slight alteration in the definition of the working depth W. In strain wave gearing it is the radial length of the active profile. This is the radial distance that mating teeth are in actual contact. The teeth interengage up to twice the addendum as in standard gears but from $0.77d$ to this depth they are not in contact. In the calculations of the pressure angle for the strain gear, consideration has been given to the slight angular difference caused by the strain gear being deflected. This requires the pressure angle on the strain gear to be larger than the pressure angle on the ring gear. The angular difference is an angle whose tangent is $1.44d$ divided by the length of the arc for one half of a strain wave. With this correction, the contact surfaces of the two gears should be parallel as they slide over each other. For a normal size steel strain gear this angular correction is approximately one degree and for other than precision gears, this correction might advantageously be divided between the two gears as angular tolerance.

DESIGN FORMULAE

Since the interaction between the teeth is dissimilar to that of standard gearing it is questionable whether standard gear formulae are applicable. This is particularly true of the Hertz Equation which deals primarily with conditions of point or line contact. In strain wave gearing, properly proportioned, there is sliding surface contact, with the action of wear, elasticity and skewing of the strain wave under load tending to maintain this surface contact. Since preferably over 50 percent of the teeth are in engagement, inaccuracies of a few teeth tend to become corrected as the gear wears. Considering the tooth as a beam also does not appear applicable due to the pressure angle relationship to the tooth size. Shearing strength, tooth contact pressures, tensile stress in the deflected strain gear and the radial load on the stress inducer appear to be determining characteristics in strain wave gearing. Formulae for these have been developed.

$\sigma_{max}$=Maximum tensile stress in deflected ring at outside crest of wave, p.s.i.
$\sigma_1$=Tensile stress in deflected ring at wave base, p.s.i.
$\sigma_s$=Shear stress, p.s.i.
$\phi$=Pressure angle, degrees
$C$=Percentage of teeth in contact (tolerance center)=.50
$d_1$=Deflection (diametral), inches
$E$=Modulus of elasticity, p.s.i.
$e_m$=Mechanical efficiency
$f_1$=Coefficient of sliding friction, gear teeth
$f_2$=Coefficient of friction, strain inducer
$F$=Face width of gear, inches
$l$=Width of ring, inches
$n$=Number of lobes on strain inducer
$r$=Radius of ring, inches
$S_P$=Tooth contact pressure, p.s.i.
$S_w$=Surface endurance limit, p.s.i.
$t$=Thickness of ring, inches
$T_1$=Input torque, pound inches
$T_o$=Output torque, pound inches
$W_1$=Radial load required to deflect ring, pounds
$W_T$=Radial load on strain inducer with applied output torque, pounds

FORMULAE $$\sigma_{max}=2.95\frac{td_1E}{r^2} \quad \text{(when } n=3\text{)} \qquad (4)$$

$$\sigma_1=1.56\frac{td_1E}{r^2} \quad \text{(when } n=3\text{)} \qquad (5)$$

$$W_1=2.6\frac{d_1lt^3E}{r^3} \quad \text{(when } n=3\text{)} \qquad (6)$$

$$\sigma_{max}=1.03\frac{td_1E}{r^2} \quad \text{(when } n=2\text{)} \qquad (7)$$

$$\sigma_1=.59\frac{td_1E}{r^2} \quad \text{(when } n=2\text{)} \qquad (8)$$

$$W_1=.56\frac{d_1lt^3E}{r^3} \quad \text{(when } n=2\text{)} \qquad (9)$$

$$T_o=\frac{\pi}{4}\frac{r^2FS_W\cos\phi}{\sin\phi} \qquad (10)$$

$$T_o=.63\, r^2F\sigma_s \qquad (11)$$

$$T_o=T_1Re_m \qquad (12)$$

$$T_o=T_1x\frac{1-f_1\tan\phi}{\tan\phi+f_1}\times\frac{1-f_2\frac{.458dn}{r}}{\frac{.458dn}{r}+f_2} \qquad (13)$$

$$W_T=W_1+\frac{T_o}{nr}\times\frac{\tan\phi+f_1}{1-f_1\tan\phi} \qquad (14)$$

$$\sigma_s=1.6\frac{T_o}{r^2F} \qquad (15)$$

$$SP=1.27\frac{T_o\sin\phi}{r^2F\cos\phi} \qquad (16)$$

$$e_m=\frac{1}{R}\times\frac{1-f_1\tan\phi}{\tan\phi+f_1}\times\frac{1-f_2\frac{.458dn}{r}}{\frac{.458dn}{r}+f_2} \qquad (17)$$

$$T_1=\frac{T_o}{Re_m} \qquad (18)$$

$$T_1=T_o\times\frac{\tan\phi+f_1}{1-f_1\tan\phi}\times\frac{\frac{.458dn}{r}+f_2}{1-f_2\frac{.458dn}{r}} \qquad (19)$$

Formulae 4 to 9 are given in two groups, one being for use when $n=3$ and the other when $n=2$. Introducing $n$ into the formulae would have made it needlessly complex, particularly since there appears to be no advantage or need for a strain gear with $n$ greater than 3 for ordinary purposes. These formulae have been derived from standard stress and load formulae in the literature. They have been reduced to a form most applicable to strain wave gearing. It has been assumed that the strain gear is a ring of rectangular shape and that the radius is to the neutral axis of the ring. Deflection $d_1$ is given as a diametral change in preference to a radial change as this dimension is almost identical to deflection $d$, that is, the height of the strain wave. For all practical purposes these values may be assumed to be the same.

Formulae 4 and 7 are used to calculate the maximum stress which is encountered in any portion of the strain gear. It is for the outside surface of the ring at the crest of the wave and assumes point loading by the deflecting media. Loading over an area or by a large radius decreases the tensile stress at this point. It will be noted from Formulae 5 and 8 that the stress at the base of the wave is slightly more than half as much as at the crest. This could be deduced by inspection of the wave form which has a more gentle curvature at the base than at the crest. By an appropriate lobe configuration on the strain inducer, the stress at the base and crest can be made the same. However, this changes the wave shape and requires different tooth configuration.

The validity of Formula 4 has been checked by photo-elastic means using (1) two different diameter rings, (2) three different thicknesses of rings and (3) six different deflections. In every instance the photo-elastic results were slightly lower than the value derived by the formula varying from one percent less to ten percent less. Since the increase in length of the circumference from the internal load which adds to the tensile stress does not add to the static fringe pattern, it would appear to be normal for the photo-elastic results to be somewhat less.

Formulae 6 and 9 determine the radial load imposed on the strain inducer for deflecting the strain gear. This is the minimum radial load on the strain inducer when no power is being transmitted. The load data derived from these formulae are used in Formula 14 to determine the total or maximum radial load on the strain inducer.

Formulae 10 and 11 are used to determine the maximum permissible output torque, Formula 10 being based on the surface endurance limit on surface compression of the contact surfaces as usually defined in connection with gearing, and Formula 11 on the minimum shear strength of the teeth. Output torque in pound-inches is used instead of the actual load in pounds on a tooth since, for strain wave gearing, 50 percent of the teeth are in contact and the load is equalized in the gear arrangement to produce torque without any side thrust on bearings or shafts. As will be explained, this is a great advantage of strain wave gearing.

In Formula 10, $$\text{Torque (lb.}'') = \frac{r''\times 2\pi r''\times .5\times .5\times F''}{2\sin\phi} S_W \text{(p.s.i.)} \cos\phi$$

If the first $r$ were transposed it would cancel out with the inches in torque and convert it to load. The next term is the circumference of the pitch circle which, when multiplied with 0.5 represents the amount of this circumference that has teeth in contact with the main gear. Since only half of the engaged teeth are positioned to develop power in one direction, this must be multiplied by 0.5. This, then, represents the length of the pitch circle circumference that has teeth engaged to resist the applied torque. Dividing this by the sine of the pressure angle converts it to the total length of the contact area. However, since the teeth are moving in and out over this length, it must be divided by two to obtain the average. Multiplying this length by the face gives the total area in contact at any instance. Finally, this must be multiplied by the surface endurance limit for the material from which the gears are made, and since the force component is at an angle, this must be multiplied by the cosine of the pressure angle. In most instances the surface endurance limit does not appear to be the limiting factor in torque development with strain wave gearing.

In Formula 11, $$\text{Torque (lb.}'') = r''\times 2\pi r''\times .5\times .5\times .403\times F''\times \sigma_s \text{ (p.s.i.)}$$

Again, the first $r$ is to convert torque to load. The following three terms are as outlined in Formula 10, to find the length of the pitch circle that has teeth resisting applied torque. The next term 0.403 is average percentage of circular pitch that is in shear parallel to the pitch circle. Multiplying these by the face gives the number of square inches in shear. Multiplying by the minimum shear strength of the material completes the equation. Formula 12 is an obvious relationship of the output torque to the input torque and is inserted to introduce the similar relationship of Formula 13 where gear ratio and mechanical efficiency are expressed in terms of tangent and coefficients of friction. If the coefficients of friction are assumed to be zero then the efficiency would be 100 percent and $T_o$ would equal $T_1R$—hence, the last two expressions of Formula 13 are equal to R when $f_1$ and $f_2$ are equal to zero. Under these conditions R is equal to the product of the reciprocals of (1) the tangent of the tooth pressure angle, and (2) the tangent of the angle of the strain wave to the circumference during tooth contact. This latter angle is an angle between two lines drawn tangent to the effective pitch circle and the strain wave at the point where the strain wave crosses the pitch circle. If there were no friction, the supplied torque would exert a force normal to the surfaces represented by these angles. However, in the presence of friction the resultant forces will be inclined from the normal by the amount of angle of friction. If the tangent of the sum of these angles is expressed by functions of the component angles and $f$ equals the tangent of the angle of friction, the resulting equation is as expressed in Formula 13.

In Formula 14, where the expression dealing with the pressure angle is the reciprocal of the one in Formula 13, the load imposed by the output torque and friction is added to the initial load required to deflect the ring. This gives the total radial load which must be withstood by the strain inducer in delivering a given output torque. In the design of the strain inducer using balls or rollers having point or line contact, consideration must be given to this radial load.

Formula 15 is a transposition of Formula 11 and is used to determine the shear stress with a given output torque. Formula 16 is a transposition of Formula 10. However, "surface endurance limit $S_W$" has been changed to "tooth contact pressure $S_P$" as the formula is used to determine the contact pressure on the active profile of the teeth with a given torque output.

Mechanical efficiency of the entire strain wave gear system is calculated by Formula 17. As was seen in Formula 13, without friction, the last two expressions would be equal to R. If this were divided by R the results would be 1 or 100 percent efficiency. With friction, a lesser value is obtained representing the percentage of transmitted power. A strain gear to the following dimensions would have an efficiency of 82 percent.

| | |
|---|---|
| Diameter, $D_D$ ---------------------inches-- | 4 |
| Lobes, $n$ ------------------------------ | 2 |
| Deflection, $d$ ----------------------inch-- | .04 |
| Coefficient $f_1$ --------------------------- | .05 |
| Coefficient $f_2$ --------------------------- | .0015 |
| Ratio, $D_D/d$ ---------------------------- | 100/1 |

This efficiency value is for an entire gear reduction unit. Friction in the input and output bearings is negligible since there are no thrust or radial forces in strain wave gearing. In this example, coefficients of friction were chosen that appear to be a normal average under normal lubricating conditions, $f_1$ being for a lubricated surface sliding and $f_2$ for rolling. If these two coefficients are reduced to the lowest value which appears to be commerically feasible, the efficiency would be 96 precent. If the coefficient of friction of both $f_1$ and $f_2$ were doubled, a condition representative of poor workmanship and poor lubrication, the efficiency would be 69 percent.

Formula 18 is a transposition of Formula 12. Formula 19 is a transposition of Formula 13.

These formulae were developed by analysis of tooth motion using data extrapolated from standard engineering practice. It is believed that specific experimental tests on strain wave gearing will undoubtedly bring about modifications to these formulae and may possibly introduce other parameters. Until such time as actual tests have established different values the conservative values from extrapolated data should be used.

DISTINCTIVE FEATURES

The radically different principles upon which the operation of strain wave gearing depends produces parameters differing considerably from those normal for conventional gearing. These differences are outlined and discussed in the following paragraphs.

Many of these features are interrelated and consequently in the discussion of one feature others may be involved. In many instances there is only a distinctive difference if some of the other parameters are comparable—for example, "torsional rigidity of output" should not be expected with a gear which features "light weight."

*Adjustable freedom from backlash.*—Tooth interengagement in strain wave gearing is the result of the radical deflection of the erlatively thin ring strain gear. Engagement is on both sides of the crest of this deflection with the tooth contact area on the strain gear on the side of the tooth toward the crest of the wave. Directly at the crest of the wave, and for approximately 10 percent of the tooth pitch on each side, the teeth are in mesh but not in contact. By making the strain inducer capable of adjusting the deflection, a gear system with backlash can have it removed by increasing the deflection to the point where the crest of the wave is radially deflected further into the mating tooth spaces until the teeth at each side come into contact.

As in standard gearing which has its center distance changed, this partially destroys the theoretical tooth relationship. However, in strain wave gearing this does not appear to have a marked deleterious effect as the angle change from the theoretical parallel mating surfaces is minute. Since the strain gear is a relatively thin gear, by increasing the deflection the crest can be made to "spring load" the contacting piece by changing or skewing the shape of the strain wave. A slight amount of this is desirable to eliminate all backlash and to preload the piece to assure freedom from blacklash after high spots on the teeth have been worn away. Increasing the deflection beyond a moderate spring load, however, is not recommended due to the added stresses imposed on the strain gear at the crest of the wave.

It has been experimentally ascertained that a gear system can be easily made free from all backlash without a marked increased in input torque. This was checked on a gear made to the approximate dimensions of the gear described in connection with the calculation of the mechanical efficiency of the system by Formula 17 above, except that the number of lobes was three instead of two. An eight foot long boom was attached to the output shaft and backlash was measured at the end of this boom by a 0.001 inch dial indicator. No backlash was discernible under this test.

*Precise transmission of motion.*—The gear ratio relationship between the input and output is always determined by approximately 50 percent of the teeth, half of those opposing the other half. Consequently, the position of the output relative to the input at any one instant is not determined by one or two teeth which may, due to faulty manufacture or wear, be improperly spaced or formed. Also these teeth are distributed at several points ($2n$) around the circumference and hence slight eccentricities do not affect the input-output relationship. The use of small teeth also tends to increase the actual number of teeth in active engagement. This precise transmission of motion is inherent in correctly made strain wave gears and consequently a large number of the distinctive differences play a contributing roll. The major ones are discussed in reference to adjustable freedom from backlash, large percentage of teeth in contact, uniformly distributed wear, balanced forces, torque developing forces at point of greatest leverage, surface contact, torsional rigidity of output, no "center-distance" problem, insensitive to misalignment and differential motion, insensitive to eccentricity and tooth shape.

*Large percentage of teeth in contact.*—With strain wave gearing made to the basic dimensions, 55 percent of the teeth are in active engagement. Fifty percent of these are actively engaged with one side of the teeth and the other 50 percent are on the other side. Consequently 27.5 percent are in action at any one instant tending to drive the output. This 27.5 percent are distributed around the periphery of the strain gear to a number of places equal to the number of lobes on the strain inducer. These teeth vary in degree of engagement from just entering to a radial depth of $0.77d$. This gives an active profile of $$\frac{0.77d}{\cos \phi}$$

*Low pitch line velocity.*—In this respect strain wave gearing is especially unique. There are two gears involved in the entire gear train under normal circumstances, and one of these is stationary with zero pitch line velocity. The other has a rotational speed equal to that of the output shaft. Since the gear ratios of strain wave gearing are relatively large in many cases, the output rotational speeds are relatively small, of the order of ten to a hundred revolutions per minute in many applications. With a four inch diameter gear this would give a pitch line velocity of only 100 feet per minute or less.

*Uniformly distributed wear.*—Each revolution of the input brings every tooth on each gear into active contact with mating teeth on the other gear several times. This effectively prevents differential wear particularly in reciprocating use such as on hand operated controls or instruments. The large percentage of teeth in contact at all times also tends to distribute the wear over all the teeth. Incorrectly positioned or proportioned teeth will receive a disproportionate amount of wear tending to correct these teeth. Subsequent wear will be uniformly spread over all of the teeth.

*Small tooth motion.*—In strain wave gearing the small size teeth move radially in and out of engagement. Their total travel is equal to the deflection and they are in contact with mating teeth at 77 percent of the deflection. For a gear system as described above in reference to the calculation of the mechanical efficiency under Formula 17, the total tooth motion would be 0.04 inch with a radial sliding motion of 0.03 inch. Advantages of this are discussed in reference to low tooth sliding velocity, ease of lubrication and quiet operation.

*Balanced forces.*—Since all of the forces necessary to produce torque are distributed at the pitch lines of both gears at a number of equal points equal to the number of lobes on the strain inducer, they tend to balance out and become equal. This effectively prevents any radial forces being inserted on the output shaft bearing as these tend to be self-centering. The same condition prevails on the input since the strain inducer also exerts its radial forces at a number of places equally spaced. All of the active forces within the strain wave gearing system are balanced so that they tend to produce only the desired result—the transmission of torque.

*Torque developing forces at points of greatest leverage.*—Since the application of the forces which tend to produce torque in the output shaft is distributed around the periphery of the gear at its pitch line, the maximum torque can be developed for given forces. The pitch line of an internal gear used in this manner gives the maximum lever arm obtainable in a given size gear. Also, since the forces are distributed at several equidistant points on the pitch line, the lever arm is effectively equal to the pitch diameter.

*Low tooth sliding velocity.*—For a small tooth moving radially in and out for a distance only equal to its height, a very low tooth sliding velocity can be obtained. For the gear used in connection with the determination of the mechanical efficiency by Formula 17, a tooth moves 0.04 inch into and out of engagement for each 180 degrees of rotation; or 0.04 inch radial motion in one quarter revolution. At 1800 r.p.m. this would give an average radial tooth velocity of 24 feet per minute. The maximum sliding velocity on the active profile of the tooth would then be 27.5 feet per minute.

*Large angle of action.*—Since 55% of the teeth are in active contact, the total angle of action would be $0.55 \times 360°$ or 198°. For each point of contact it would be $198°/n$. The angle of approach and the angle of recess for strain wave gearing are equal. Consequently the angle of approach and the angle of recess are each equal to one-half the angle of action, or 99°.

*Surface contact.*—The active profile on all of the teeth is a plane surface. As the tooth on the strain gear approaches the mating tooth on the ring gear it is canted so that its active profile is parallel with the active profile of the tooth it is entering. It then slides into and along this active profile until it approaches the crest of the strain wave. It then leaves this side, and while travelling over to the other side, it changes its cant so that the opposite active profiles become parallel just as they come into contact. For the balance of its contact, it is sliding over these active profiles. At no time, other than the exact instant of tooth engagement is there a line or point contact. This area contact is therefore a very important aspect of the invention. For the gear above described in connection with the calculation of the mechanical efficiency using Formula 17, the area of this contact surface at the tolerance center would at all times be 7.0 square inches. Half of this, or 3.5 square inches is load bearing in one direction. This large area in contact reduces the surface pressures to a low level, and at the same time makes it possible to bear much greater loads than would be the case with ordinary gearing.

*Sinusoidal tooth motion.*—The shape of the strain wave is similar to a sine wave. This effectively eliminates all shock as the teeth gradually decelerate to zero radial velocity after passing the tooth contact area. They then accelerate in the opposite direction up to the point of tooth engagement. During tooth engagement they are moving essentially at constant velocity. This action is similar for both ends of the radial tooth travel.

*Large gear reduction.*—Due to the differential action between the two gears, large gear reductions are easily obtained without multiplicity of parts. One of the means of calculating gear ratio is the pitch diameter of the driven gear divided by the deflection. Since the deflection can be made very small, the gear ratios can be made very large without sacrificing the other advantages of strain wave gearing.

*Large torque capabilities.*—Calculations indicate a surprisingly large torque-producing capacity for strain wave gearing. For example, assuming that the gear above discussed in connection with the calculation of mechanical efficiency using Formula 17 is made from a steel with a shear strength of 50,000 p.s.i., the output torque capacity would be 126,000 pound-inches. The tooth contact pressure for this torque would be less than 22,000 p.s.i. If the input were driven at 1800 r.p.m., the power output at this torque would be 36 horsepower. It is obvious that a gear of this size would not have sufficient thermal capacity, even with cooling, to continuously deliver an output of this amount. Sample strain wave gears have been tested for short periods of operation at approximately one-half this value without damage. From this, it would appear that output torque capacity is not the limiting factor. However, if a gear system of this size were used for the transmission of one horsepower, it would have an overload or shock resistance safety factor of 36, as compared with an overload or shock resistance safety factor of many conventional gearing systems of the order of two or three.

*Low tooth contact pressures.*—As was pointed out in the discussion of surface contact, the load bearing area of the teeth in contact for the gear system above mentioned in calculating the mechanical efficiency using Formula 17 is 3.5 square inches. With any reasonable load application, this area is of sufficient size to reduce the unit load pressure to a small value. For example, in transmitting one horsepower at 1800 r.p.m. input through this gear system, the tooth contact pressure would be only 605 p.s.i. Even with the immoderate transmission of 36 horsepower, the tooth contact pressure of 22,000 p.s.i. is well below the endurance limit of steel.

*No load on bearings.*—All of the forces within strain wave gearing are counterbalanced as discussed above in reference to balanced forces. Consequently a strain wave gearing system can be made to operate without bearings on either the input or the output. The forces all tend to be self centering. Several models of strain wave gearing applied to motors have used this centering tendency as the motor bearing for one end of the armature. Therefore the bearings that are used on a strain wave gearing system are only to enclose the mechanism and withstand forces applied from the outside.

*Low shear stresses in the teeth.*—Due to the large percentage of teeth in contact and the power developed at the greatest point of leverage, the shear stresses are very low for any reasonable load application. For the gearing used in determining the mechanical efficiency, using Formula 17, transmitting one horsepower at 1800 r.p.m. input, the maximum shear stress of the teeth would be 1400 p.s.i.

*High efficiency for high gear ratio.*—The efficiency of strain wave gearing is discussed above in reference to Formula 17. It was there shown that a gear system with a ratio of 100 to 1 had an over-all efficiency between 69 and 96 percent depending on workmanship and lubrication. Increasing the gear ratio does not decrease the efficiency as markedly as is the case in standard gearing. If the same easily attainable coefficients of friction and the same type strain inducer are used, a 400 to 1 ratio gear system will have an 80 percent efficiency in relation to 93 percent efficiency for a 100 to 1 ratio. By the use of a different type strain inducer, more suitable for the higher ratio, the efficiency of the 400 to 1 ratio system will be 88 percent. It has been experimentally ascertained that a 300 to 1 ratio strain wave gear system built into a motor had an efficiency in excess of 75 percent when tested under the adverse condition of light loading.

*Torsional rigidity of output.*—The output shaft can be directly coupled to the driving gear at its outside diameter. This driving gear in turn can be "keyed" to the stationary gear by 55 percent of the teeth which are engaged. The torsional rigidity can therefore be made equal to a short tube with the wall thickness, length and diameter equal to those of the strain gear. A short tube has the greatest torsional rigidity of any type section of its size, weight and material.

*Few parts.*—As a torque transmission unit that does not have any exterior lateral forces applied to it, the entire unit can be made from three parts, a ring gear, a strain gear and a strain inducer. To use this torque will probably require a few additional parts. An actual strain gear unit has been built into a fractional horsepower motor with only seven (7) parts added to the motor; a ring gear, a strain gear, an inner ring, three one-half inch balls and an output shaft.

*Ease of lubrication.*—Low velocity and short travel are probably the two greatest contributors to simplifying the lubrication problem. Also, the teeth move radially in and out tending to distribute throughout the entire gear surface by capillary action any lubricant that is present. Since the travel of the tooth on the active profile is only a short distance before it moves to another active profile, there is no replenishing problem—the tooth does not slide far enough to force out all of the lubrication. In addition, the lubrication material that is at the head of the tooth as it is moving into place gets spread over the entire active profile.

*Small size.*—As indicated above in regard to the large torque capabilities, a strain wave gear reducer has a large capacity for given size. As a consequence, a unit for the same capacity would be relatively very small in size. Calculations indicate that, excluding the question of thermal capacity, a strain wave gear reducer would be less than 10 percent in cubic size of that of a standard gear reducer of equivalent ratio and torque capacity.

*Ease of manufacture.*—Teeth of the size and shape used in strain wave gearing can be broached from tubing in quantity production lots. Since the gears are essentially rings, there is no center hole to which the teeth can be eccentric. Also, as the strain gear is deflected in service, ellipticity or out-of-roundness has no serious effect. Slight variations in tooth contour or dimensions can be compensated for by altering the deflection upon adjustment of the strain inducer. The usual problem of center distance between the gears does not exist in this case, and the balanced forces in the system tend to keep the gears coaxial. In moderately loaded units, a molded neoprene or nylon strain gear can be used.

*Light weight.*—Light weight is the result of few parts and small size.

*Quiet operation.*—While quiet operation is most important and somewhat unique in the present invention, it is the result of adjustable freedom from backlash, precise transmission of motion, large percentage of teeth in contact, low pitchline velocity, small tooth motion, balanced forces, low tooth sliding velocity, surface contact, sinusoidal tooth motion, and low tooth contact pressures.

*Coaxial input-output.*—In this respect the strain wave gearing system is similar to epicyclic gearing but dissimilar to other types of gear reducers. However, due to its small size the strain wave gearing system is ideally suited for a reduction unit within and a part of an electric motor. It is also of great utility on scientific instrument control shafts where either the whole gear unit can be turned for fast control or the coaxial input for vernier or slow control.

*Ratios from 10 to 1 to 1,000,000 to 1.*—Deflection and diameter are the determinants of gear ratios—the smaller the deflection is relative to the diameter, the higher the gear ratio. Where gear ratios lower than approximately 75 to 1 are desired, it is necessary to use a material that has a lower modulus of elasticity than steel to obtain the necessary deflection. Since strain wave gearing has surface contact, low tooth contact pressures, low shear stresses in the teeth, and distributed stresses, nylon appears to be ideally suited for this purpose. For ratios from about 25 to 1 to 10 to 1 the proper grade of rubber or neoprene may be used to advantage.

Where it is desired to increase the ratio beyond approximately 200 to 1, a ball or roller strain inducer is used. The strain wave is generated by the individual balls or rollers which have a planetary reduction relationship to the sun inner raceway. In order to obtain the over-all ratio, the ratio of the strain wave gear is multiplied by the planetary reduction relation of the planet rollers with the sun inner raceway. Ratios up to 1000 to 1 can easily be obtained by this method without any increase in complexity.

For ratios from 1000 to 1 to 1,000,000 to 1, dual strain wave gearing is used. With this there are three gears instead of the usual two; a stationary ring gear, a movable driven ring gear and a strain gear. The two ring gears are keyed together by the deflected strain gear. The operation of dual strain wave gearing is described below.

*Ratio selection not limited.*—Usually in differential mechanisms where teeth are used, ratios frequently are in steps and the ratios in between these steps can only be obtained by compounding. The ratios of toothed strain wave gearing, also, must of necessity be in steps. However, these steps are considerably smaller and are without voids. For example, the ratio can be stated simply as the number of teeth in the driven gear divided by the number of lobes on the strain inducer. Then for a three lobe strain inducer, ratios can be made to change in steps of one third. When the planetary strain inducer is used, this can be further divided to obtain any gear ratio desirable.

*No center distance problems.*—Strain wave gearing does not depend on the accurate location and alignment of shaft centers to obtain proper tooth engagement. Input is coaxial with the output and all forces are inherently balanced to automatically assure this coaxiality.

*Insensitive to misalignment.*—Misalignment of the face of the strain gear in relation to the face of the ring gear is relatively unimportant due to the low tooth contact pressure and low shear stresses in the teeth.

*Surface sliding one direction only.*—With rotation in one direction, the teeth on the strain gear always enter on one side of mating teeth and leave on the other side. This assists in lubrication and in keeping the surfaces free of foreign matter, thereby reducing the coefficient of friction to the lowest possible level.

*Differential motion insensitive to eccentricity and tooth shape.*—A large change in tooth shape or contour produces the greatest effect on the percentage of teeth in contact. Even with such a shape, there are still many teeth in contact at several equally spaced points on the pitch circle. While this change has a deleterious effect on precise differential motion, the effect is small due to the size and number of teeth still in contact. As these teeth still have the tendency to center the input and output so as to make them coaxial, eccentricity of the gear pitch line with the bearing will tend to put a radial load on this bearing along the axis of the eccentricity. Unless this eccentricity is sufficiently large to interfere with tooth engagement, it should not affect the differential motion.

*Distributed stresses.*—One of the highest stressed points in strain wave gearing is the outside surface of the strain gear at the crest of the wave. Fortunately, the stresses introduced into the strain gear upon the transmission of torque are not applied at the crest of the strain wave but instead are on the side of the wave where there is practically no stress from the deflection. Consequently the tension and compression stresses are at the base and crest of the wave, and the shear stresses are on the side of the wave. They are therefore not additive.

Unfortunately as the consequence of small size and light weight, the thermal capacity of strain wave gearing will in many cases be its limiting characteristic. This would indicate that in order to realize its potential capacity from other standpoints, forced cooling means should be used for continuous heavy duty service.

*Table 3*

COMPARATIVE VALUES

| | Epicyclic | Herringbone | Single worm | Helical worm | Strain wave |
|---|---|---|---|---|---|
| Output H.P. at 18 r.p.m. | $1_c$ | $1_c$ | $1_c$ | $1_c$ | $1_f$. |
| Ratio | $97.14_c$ | $96.2_c$ | $108_c$ | $100_c$ | $100_f$. |
| Efficiency, percent. | $85_c$ | $85_c$ | $40_c$ | $78_c$ | $82_f$. |
| Number of gears | $13_c$ | $4_c$ | $2_c$ | $4_c$ | 2. |
| Number of bearings. | $17_c$ | $6_c$ | $6_c$ | $6_c$ | 2. |
| Pitch line velocity, f.p.m. | $1{,}500_e$ | $1{,}500_e$ | $1{,}500_e$ | $1{,}500_e$ | $18_f$. |
| Tooth sliding velocity, f.p.m. | $2{,}500_e$ | $2{,}500_e$ | $1{,}500_e$ | $2{,}500_c$ | $28_f$. |
| Tooth contact pressure, p.s.i. | $50{,}000_e$ | $50{,}000_e$ | $5{,}000_e$ | $50{,}000_e$ | $605_f$. |
| Shear stress, p.s.i. | $25{,}000_e$ | $25{,}000_e$ | $15{,}000_e$ | $25{,}000_e$ | $1{,}400_f$. |
| Teeth in contact, percent. | $7_e$ | $5_e$ | $2_e$ | $3_e$ | $50_f$. |
| Safety factor | $3_e$ | $2_c$ | $2_c$ | $2_c$ | $36_f$. |
| Height, inches | $13_c$ | $14_c$ | $23_c$ | $16_c$ | $6_e$. |
| Length, inches | $15_c$ | $20_c$ | $19_c$ | $17_c$ | $6_e$. |
| Width, inches | $13_c$ | $10_c$ | $14_c$ | $10_c$ | $6_e$. |
| Cubic volume, inches. | $2{,}500_c$ | $2{,}800_c$ | $6{,}100_c$ | $2{,}700_c$ | $216_e$. |
| Weight, pounds | $246_c$ | $280_c$ | $230_c$ | $205_c$ | $30_e$. |
| Tooth contact | Line | Line | Line | Line | Surface. |
| Quiet operation | No | Yes | Yes | Yes | Yes. |
| Sinusoidal tooth motion. | No | No | No | No | Yes. |
| Balanced forces | Yes | No | No | No | Yes. |
| Uniform wear | No | No | No | No | Yes. |
| Controllable backlash. | No | No | No | No | Yes. |

*c*=data obtained from catalog of gear manufacturer.
*e*=estimated value.
*f*=derived from formulae.

In order to visualize the comparative value of these distinctive features, data are given in Table 3 for four different types of gear reducers compared with strain wave gearing. For the strain wave reducer, the gear described in connection with the determination of mechanical efficiency under Formula 17 is used, placed in a housing including input and output shafts and bearings. Dimensions in all cases are over housings only and do not include the protruding shafts.

Wherever possible, data was taken directly from a representative catalogue of a gear manufacturer for the other types of gearing. In all cases a unit listed as having the necessary torque to deliver one horsepower at 18 r.p.m. with the closest gear ratio of 100 to 1 was selected. In some instances the units were not recommended for 1800 r.p.m. input and in these cases the one horsepower was calculated proportionately from the 1200 r.p.m. listings. Where there was any choice or any discrepancy was found, the value which favored the particular reducer was used in each instance.

For example, the efficiency of one of the reducers was listed as 85% but the value when taking the efficiencies of its component parts was 75%. Since the stated efficiencies in both instances do not include ratio speed and load factors they should be considered approximate only.

Many factors were not listed in the sources of reference and in these instances estimations were made that are believed to be conservative and of the proper order for the type of gear under consideration. Wherever values are estimated they are followed by an E. For the strain wave reducer, most of the values were derived from the formulae discussed above.

BASIC FORMS

In the preceding explanation of strain wave gearing, the strain wave gearing has been illustrated and described as an elliptical two lobe cam sliding directly on the strain gear. This simplified form facilitated explanation of the basic principles. However, there are many possible variations for the strain inducing element, each one having its own particular advantages.

The form of Figures 19 and 20 is the most similar to the one piece two lobe cam referred to above. In this instance the strain inducer shaft 82 carries a two lobed strain inducer cam structure 72, which is surrounded by a rigidly attached ring 83 of material having a low coefficient of friction and having good lubrication properties. A typical material for this purpose would for example be sintered impregnated bearing bronze, or a suitable wrought bearing bronze. The arbor portion 72 on which this ring 83 is held is desirably capable of being expanded so as to produce the desired amount of ellipticity.

The most ideal position is to have all points on the periphery of the expanded arbor just touch and fit inside the fully expanded ring 83. Under these conditions strain wave gearing has the greatest torque capabilities as an applied load cannot skew the strain wave. In practice, supporting it for 60° on each side of the crest on the wave is sufficient. Any suitable form of expanding arbor construction can be used, one example being shown in Figures 21 to 24 inclusive. In this form the shaft 82 has a square end 84 and beyond that has male threads 85. A washer 86 has a squared opening 87 which fits on the squared shaft portion 84, and is provided with a radial flange 88 and opposed wedge faces 90 outwardly directed and respectively engaging with cooperating wedge faces 91 on a square opening 92 formed in arbor segments 93 and 94 which are generally of circular exterior contour, becoming elliptical when the segments separate. The washer is adjusted to any desired position by interposing a shim 95 of the desired adjusted thickness between the arbor segments and the flange of the washer, and the washer flange is tightened to engage the arbor segments with the shoulders 96 on the end of the shaft by means of a nut 97 on thread 85. If it is desired to force the arbor segments out farther and modify the contour of the strain inducer, this can be accomplished by changing the shim thickness and tightening the nut 97. This construction is self centering, and lends itself to varying degrees of wedge action to modify the strain inducer contour.

A strain wave gear made with a plain bearing strain inducer is of particular value in those cases where the gear train is to be self locking, as in a hoist or rotary table. It is particularly resistant to shock and rigid as it positively holds all of the teeth in an immovable position. However, it is only usable in slow moving properly lubricated applications due to its relatively low efficiency which is about 25 to 50% depending upon the coefficient of friction. Under ideal conditions with the coefficient of friction of 0.01, the efficiency would be about 60%.

In some applications it is desirable to have the self centering advantages of a three lobed strain inducer as shown for example in Figures 25 and 26. While this retains all of the advantages in strain wave gearing, in many instances the lesser stress imposed in the strain gear at the crest of the wave by the two lobed system is preferable. For the same gear ratio, the tensile stress in the three lobed strain gear is nearly three times as great as in the two lobed form. When using any three lobed strain inducer, care should be taken to insure that the tensile stress at the crest of the wave is well within the notch endurance limit for the material being used.

By using a ball-bearing for the strain inducer, as illustrated, for example, in Figures 27 and 28, the coefficient of friction can be materially reduced with a resulting increase in efficiency. This construction shows an arbor 72 on a shaft 82, and the arbor is of the desired strain inducer form and engages the inside of inner bearing race 97 which receives bearing balls 98 in a suitable groove, the balls being held on the outside by an outer race 100 having a cooperating internal ball-engaging groove. Since the balls closely fit the races, by expanding the inner race to an elliptical shape, the outer race is expanded to a similar shape. Rotation of the inner race will then send a wave around the outer race. Careful measurements have shown that the wave form generated in this manner is identical with that generated by two lobed plain strain inducer. For best results, in order to insure correct wave generation, there should be at least 36 balls in the bearing. The outer race should be thin enough to prevent it from being stressed beyond the endurance limit, and the inner race must be able to withstand the initial expansion. Expanding the bearing causes the balls to have added clearance except at the crest of the wave. As the bearing is used to transmit torque, the load is shifted to the side of the wave, and, if heavy loads are to be handled, the inner race should be supported for at least 60° on each side of the crest to prevent it from deflecting under this load. If a bearing is used with a loading slot, this slot should be placed on the major axis of the inner race.

For moderate loads and larger diameter strain gears, the three lobe cam follower strain inducer shown in Figures 29 and 30 can be used. The shaft 82 mounts a planet mounting 101 thereon. The planet mounting has at equal circumferential positions as shown eccentric pins 102 each positioned at the same radial position, each on an axis parallel to the axis of shaft 82 and each carrying rotatable about the pins, but eccentric to their axes, standard ball bearings 103 which act as cam followers. Thus by setting the positions of the eccentric pins and locking them in the proper positions, the radial action of the cam followers can be adjusted. It will be evident that all of the cam followers will be adjusted to the same radial position and will be equally circumferentially spaced. It will also be evident that since the cam followers are capable of adjustment as desired, they can be employed not only to apply the strain wave but also to spring preload the strain gear for the purpose of eliminating backlash as already explained. The cam followers should be as large in diameter as possible to give the maximum obtainable support to the crest of the wave. This system does not have the same rigidity and does not have the same load carrying capability as the supported plain strain inducer or ball-bearing systems. Since the gear teeth that are carrying the load are not at the crest of the wave, a heavy load will tend to distort or skew the wave form when the strain gear is not supported at the side of the wave. This skewing will shift the load toward the teeth that are supported at the crest. For shock resistance this is an advantage as the strain gear has an increasing spring gradient to resist any load tending to distort it. While it is highly shock absorbent and resistant, it should not be operated under heavy load as this tends to produce additional stress in the strain gear.

Figures 31 and 32 show a form having a sun roller 104 on a separately driven sun shaft 105 which passes through an opening in a tubular shaft 82', the sun roller engaging the interiors of the followers 103 and the eccentric pins on which the followers are pivoted being left floating or rotatable and the followers constantly engaging the outside of the sun. The radial position of the followers is then determined by the size of the sun roller. This will operate much in the same manner as the form of Figures 29 and 30 except that it provides a vernier control for slow rotation of the roller carrier. If driven by the sun roller the over-all gear ratio is increased by the planetary reduction. This in effect gives you two speeds, the rotation of the sun being a relatively fine adjustment and the rotation of the main strain inducer shaft 82' being a coarse adjustment. If driven by the sun roller the over-all ratio is increased by the planetary reduction. To obtain the over-all ratio, the gear ratio of the strain wave gear is multiplied by $(r_1/r_2)+1$, which for practical purposes can be made to vary from about 2.5 to 10 depending on the diameter of the sun roller in relation to the diameter of the cam follower.

The three lobed strain inducer illustrated in Figures 33 and 34 drives by this planetary means and consequently the over-all gear ratio is from 2.5 to 10 times as great as the ratio of the strain wave gear in which it is used. In this form the inner race 97' is separated into two axially separate units 106 and 107, mounted on the shaft 82, and adjustable to increase or reduce the effective diameter of the external groove by inserting or removing shims at 108 between the race portions, and then clamping the race portions against thes hims. Anti-friction bearing elements such as balls 98' move in the internal race and in the groove of a thin outer race 100. Adjustment of the deflection is accomplished as just explained by axial adjustment of the parts of the split inner race with respect to one another. This form is very simple and satisfactory for moderate loads. Its efficiency is probably the highest of any form as the rolling friction is reduced to a low level by the absence of a ball retainer and the small number of large diameter balls or other anti-friction elements involved. No retainer for the balls is required if the deflection has been adjusted so that there is a minimum of backlash.

Under these conditions the teeth in engagement on both sides of the wave crest tend to create 3 "valleys" 120° apart in which the balls roll. If this 120° relationship were made to vary, the load distribution among the balls becomes disproportionate. Under these conditions the change in ratio at the interface between the ball and the surfaces on which it rolls is altered by the localized tangential shear stress which rapidly restores the balls to the 120° spacing. This is the principle of operation of the mechanical torque converter and it has been experimentally demonstrated that it functions in this manner on strain wave gearing. Since the slope of the strain wave produces a very small angle to the circumference of the strain gear the ball is effectively prevented from slipping. It is essentially rolling into a definitely self-locking taper and consequently the radial displacement that it is causing can not produce slippage under load. However, it is limited in its load carrying capabilities for the same reasons outlined in the discussion of Figures 29 and 30.

A planetary type drive can be made with the low coefficient of rolling friction and with the load carrying capabilities of the plain or ball-bearing strain inducer. As shown in Figures 35 and 36, a ball-bearing can be made with the size of the balls $98^2$ variant and selected to produce the desired deflection and wave form in the outside race with a standard circular inner race 110 mounted on a circular arbor 111 and cooperating with a suitably round outer race 100 which is deflected by the balls into an oval condition as illustrated at 112. In the two lobe form there will be large balls 113 at the lobes and these will grade down to minimum ball sizes at 114 intermediate between the lobes. It is preferable for best results in this case to use not less than 36 balls, and the two balls immediately adjacent to the largest ball at the lobe should be slightly oversized to distribute the initial deflection load on three lobe balls in the preferred embodiment. The rest of the balls should be of such a size that they will have no more than 0.001 inch clearance. Under load the clearance on one side of the wave will disappear and all of the clearance will be centered on the opposite side of the wave. The use of the ball retainer is optional but it may be desired for long life and high speed.

In a bearing of this type the smaller balls have the greatest planetary speed. This will cause the load carrying balls to separate under load and tend to eliminate ball to ball friction. Where the small ball would tend to overtake the large balls, the bearing is not under load and the balls have clearance with the raceway. Again, however, the change in load on the individual balls caused by separation will change the ratio of these balls to the raceways at the interface between the ball and the surfaces on which it rolls. This is caused by the localized tangential shear stress from the ball rolling into a wedge-shaped opening. This action will tend to prevent excessive separation of the balls, particularly under heavy load. With this type of strain inducer, no adjustment can be made in the deflection and consequently the two gears must be made to close tolerances. A strain inducer of this type appears particularly suited to quantity manufacture of power transmission equipment where the gears are broached and no adjustments are needed. It of course requires a special bearing which however is a simple problem in quantity production.

Where the same advantages as above are desired with a smaller gear ratio, the elliptic inner race bearing shown in Figures 37 and 38 can be used. The arbor 111 in this case will desirably be circular and the inner race 115 of the bearing has an elliptical exterior raceway, which conveniently receives anti-friction elements such as balls 98 and distorts an exterior raceway 112 into an elliptical form. This has the same action as the form of Figures 27 and 28 and it does not require an expanding arbor. Here again a special bearing is used with the desired deflection built into the inner race which has an elliptical outside and a circular inside diameter.

If any of these strain inducers can be used in conjunction with and built into other equipment, the strain inducer can be used to replace one of the bearings necessary for such other equipment. For example, if it is built into an electric motor, the strain inducer can replace and become the bearing for one end of the armature.

In all of the illustrations of Figures 19 to 38 inclusive, the strain inducers have been shown with the preferred and most likely number of lobes. However, in each of these two or three lobes can be used as desired. A larger number of lobes can also be used but this in general is not recommended as there appear to be few special advantages to compensate for the corresponding complexity. Generally, two lobes are used except where self centering is desired and in that case three lobes will ordinarily be employed. The forms of Figures 29, 30, 31, 32, 33 and 34 have three lobes to make them self centering. However, if bearings are independently employed to maintain the coaxial relationship of the input to the output, it would be entirely proper to use two lobes.

In the above examples of the strain inducers, the antifriction elements have been shown generally as balls and ball bearings. This has been done merely for convenience and is not intended to imply that ball bearings will in every case be used nor even that ball bearings are the preferred form. Figures 39 to 44 show a succession of different antifriction elements each of which is suitable for strain wave gearing in connection with the strain inducer. Thus in Figure 39 I show a ball bearing 116, while in Figure 40 I show a convex roller bearing 117, in Figure 41 a concave roller bearing 118, in Figure 42 an undercut roller bearing 120, in Figure 43 a cylindrical roller bearing 121 and in Figure 44 an opposed tapered roller bearing 122. Each of these forms has its own adherents and advantages and with proper application can be made to function satisfactorily. The basic advantage of rollers, in whatever form they may be used, is a greater load carrying capacity, or a longer life with the same load carrying capacity. In most instances the coefficient of friction is slightly greater due to the tendency of rollers to skew in service. Some rollers, notably the convex, concave and tapered, require a cage as well known to control the extent of this skewing. The undercut roller does not require a cage as a central flange or ridge 123 in the race tends to align the rollers and correct skewing. The cylindrical roller is made with the side flanges fitting sufficiently close to the ends of the rollers at 124 to assure adequate guiding. All of these bearing forms appear to provide full support for the tooth portion of the strain gear. The undercut bearing with a full complement of rollers is particularly adapted for most applications as it has a large number of rollers, is self aligning and has a high load capacity.

Figures 45 to 53 inclusive illustrate variations in the structural arrangement of strain wave gearing according to the invention. In these various forms, the output is shown at 125 and the input at 126, usually taking the form of output and input shafts as shown.

Figures 45, 46, 47, 48, 49, 50:
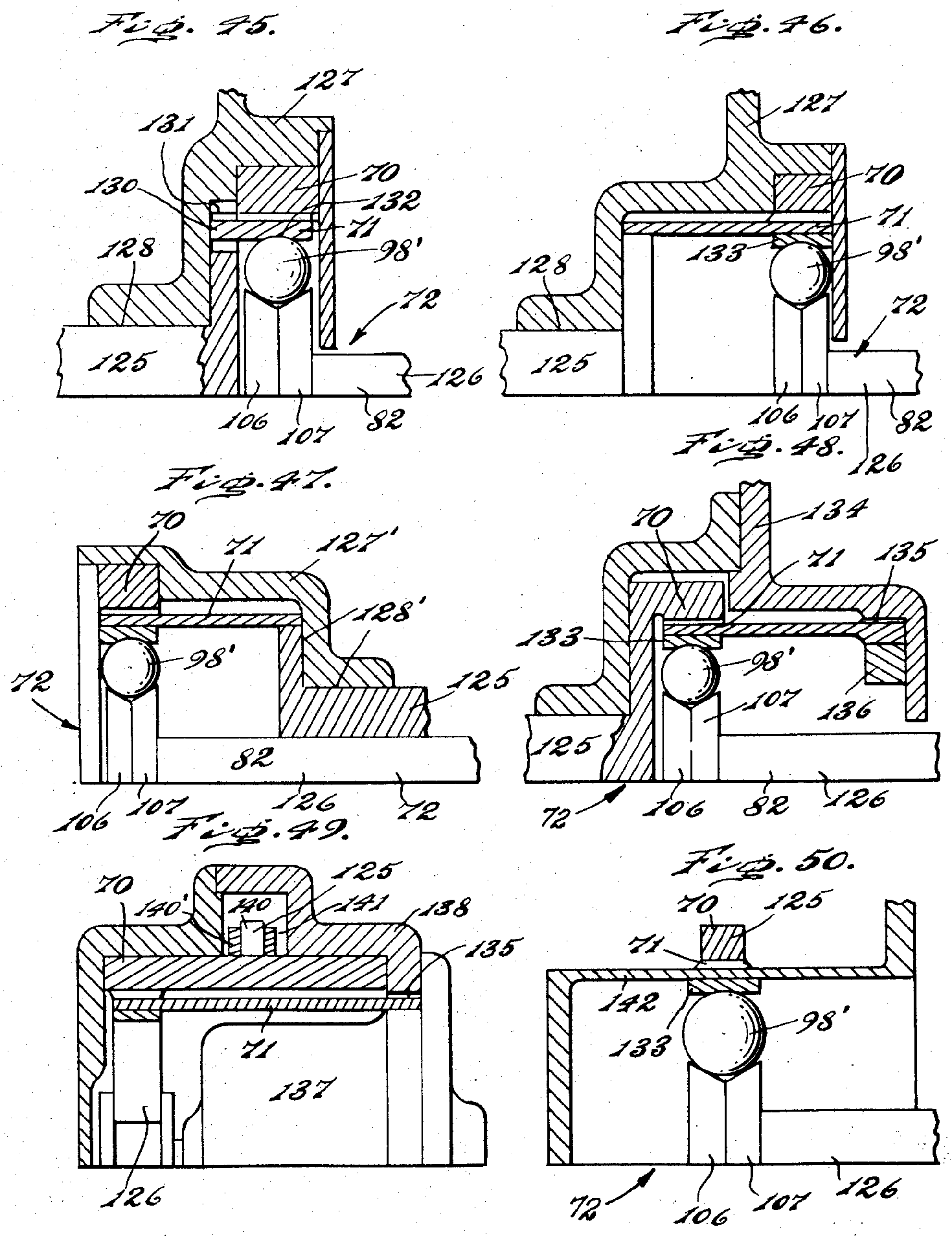

Considering first Figure 45, in this form the strain bear is the driven element coupled to the output shaft, the strain inducer is the driving element mounted on the input shaft and the ring gear 70 is provided with a stationary mounting on housing element 127 which incidentally has bearing surfaces 128 for the output shaft.

The form of Figure 45 is the most compact form of strain wave gearing shown. The strain gear has lugs 130 cut at circumferentially spaced positions around one end which interlace with cooperating lugs 131 cut at corresponding circumferentially spaced positions on the flange of the output shaft 125. Due to the deflection of the strain gear which causes it to depart from a circular contour on account of the superimposed strain wave, only relatively few of these lugs are in actual contact at any one time. This tends to limit the load capacity of this form of strain wave gearing to the load bearing capabilities of those lugs in actual contact. As the lugs slide radially in and out under a relatively great load they are likely to wear locally at the point of contact. Additional stress is also introduced in this form of strain gear since the load application is not distributed throughout the tooth contact area. This condition can be partially corrected by making the lugs on the flange of the output shaft of sufficient length and resiliency so that the elasticity of the load bearing lugs themselves will tend to distribute the load. Unless the lugs are carefully contoured, the smoothness and precise transmission of motion characteristic of strain wave gearing will be influenced adversely by the irregularity or non-uniformity in the transfer of motion from the strain gear to the output flange. There is also a possibility of backlash at the transfer point. For moderately loaded applications in which simplicity and compactness of design are primary requirements, this arrangement is satisfactory. It is not, however, recommended for heavy loads, precise transmission of motion or complete elimination of backlash.

In Figure 45 the strain gear has an internal race 132 for the balls of the strain inducer, thus avoiding the necessity of a separate external race for the strain inducer. If the strain gear is hardened so that it can withstand the contact pressures of the rolling balls, this arrangement is acceptable and provides maximum simplicity. Normally, however, it is preferred to make the strain gear somewhat softer than would be recommended for a bearing raceway, and under these conditions it is desirable to use a separate external raceway for the strain inducer. If a separate raceway is used, it is also permissible to have increased rigidity in the strain gear raceway combination.

The desirable thickness of the strain gear will of course vary with the design but will be controlled in major part by the notch endurance limit for the material being used. Since the deleterious effect of a notch increases with hardness, the actual endurance limit does not materially increase with increase in hardness. When a separate raceway is used, its thickness can be increased since it does not have the limitations imposed by the notch effect. Under these conditions the endurance limit does increase with an increase in hardness and can be made several times larger than that permissible in the strain gear. This allows a combined thickness of at least three times that of a hardened strain gear alone, with a resultant increase in rigidity.

In the form of Figure 45 and in the various forms to be discussed, it will be evident that the strain inducer may be of any of the characters shown and described, in Figures 1 to 10 and 19 to 44 inclusive, and is not necessarily limited to the ball bearing type as illustrated.

Figure 46 shows a form which resembles that of Figure 45, but has a somewhat different relationship between the strain gear and the output shaft. Where slight additional space is available, the arrangement for coupling between the strain gear and the output shaft as shown in Figure 46 will often prove to be the most satisfactory and will permit of maximum effective use of all features of strain wave gearing. Here the strain gear is a short, thin walled tube which has teeth on the outside at one end and is secured at the other end by any convenient means to the flange of the output shaft 125. The flexibility of the tube permits the gear portion to be deflected as if it were a simple ring. Since the deflection is small, the length of tube necessary to absorb the bending stresses is relatively short. The torque transmitting ability of a relatively short tube is so huge that a very thin wall can be used on such a tube to reduce the bending stresses. Coupling between the strain gear and the output flange is rigid, and direct, with no discontinuity such as the lugs in Figure 45 to interrupt the precise transmission of motion. Backlash, friction and wear are also eliminated between the output flange and the strain gear. In other respects the form of Figure 46 can be essentially the same as that in Figure 45. In the form of Figure 46 there is an external raceway 133 secured on the interior of the strain gear, which is of a character and for the purpose already mentioned in connection with Figure 45.

Figure 47 is a form similar to Figure 46 except that the input 126 and the output 125 are on the same side, the output being accomplished by a tubular shaft which surrounds the input in this case. The housing 127' is here adjusted to provide bearing surfaces 128' for the output on the opposite side of the gearing.

In the forms of Figures 48, 49 and 50 the ring gear is the driven element. These forms have equal torque transmitting capability to the forms in which the strain inducer is the driven element, and the choice of which element drives and which element is driven is largely a matter of desired outside configuration, rotational requirements and space considerations.

It will be noted that where the ring gear is the driven element the output rotation is in the same direction as the input and when the strain gear is the driven element the output rotation is in the opposite direction to the input, when considering structures of the character of Figures 45 to 50 inclusive.

In the form of Figure 48, the strain gear is stationary, being held by housing 134, and the ring gear 70 as just explained is the driven element. The strain gear in this form has teeth at one end meshing with the ring gear 70, and at the other end has splines 135 which are interconnected with cooperating splines on the inside of the housing. The splines can suitably be of the same size and shape as the gear teeth and if desired can be broached at the same time. They are forcibly held engaged with the splines on the housing desirably by locking ring 136 which engages the inside of the tubular strain gear at the spline end and is secured to the housing 134. If desired, the locking ring can perform bearing functions for guiding the input shaft. In this construction the ring gear is desirably made integral with the output shaft and rotates in the same direction as the input. This arrangement would seem to present the least fastening problems for all of the parts and its construction is conducive to optimum use of all of the distinctive features of strain wave gearing.

Figure 49 shows a very compact construction somewhat similar to Figure 48 and illustrating the combination of an electric motor 137 with strain wave gearing to produce a gear reduction in a compact form which might be used for example in a chain hoist, or linear actuator. Here the ring gear 70 is the driven element and the strain gear 71 is held in place as by splines at 135 engaged with cooperating splines in the housing 138. The ring gear 70 on the outside carries sprocket teeth 140 which engage a chain 140' of the hoist and function as the output. The housing desirably includes a channel 141 through which the sprocket teeth are carried. It will be evident that the motor shaft directly carries and operates the strain inducer 126.

There are many special instances in which strain wave gearing can produce results which are not presently obtainable. An example is shown in Figure 50, where the strain gear is a part of the thin wall of a closed end recess 142 in a sealed container, which may, for example, be a reaction vessel, a pressure vessel, a vacuum tube, or the like. The ring gear is conveniently located inside the sealed container and surrounding the wall of the recess 142, the strain gear is part of the wall of the recess and the strain inducer is outside the container, and radially inwardly positioned, with its race 133 engaging the container wall. Rotation of the strain inducer outside the container will transmit motion to the ring gear within the container even if the container is required to be hermetically sealed. Compared to prior art devices which have depended upon the effect of magnetism and the like acting through walls, the device of the present invention will transmit larger torques, and they can be transmitted with precise accuracy of motion if desired.

In constructing and describing all of the above devices, obvious elements and conventional features have been eliminated for simplicity. For example, each of the units will, where desired, be positively sealed to prevent escape of lubricant or entrance of dirt by the incorporation of any suitable seal. Since all sealing points are circular in strain wave gearing the application of gaskets or seals presents no problem.

All of the above descriptions of strain wave gearing have referred to the standard form. This is a form in which the strain inducer is internal with respect to the strain gear and the ring gear is external with respect to the strain gear. There are some applications, however, where it is desirable to invert the parts, by placing the strain inducer on the outside and the so-called ring gear on the inside. The same principles regarding types of strain inducer as already described can be followed, except that the strain inducers are merely inverted, placing parts on the inside which were formerly on the outside and parts on the outside which were formerly on the inside. In effect this turns the strain inducer "inside out."

Figure 51 illustrates one of many possible examples of inverted strain wave gearing, and it will be understood that these same principles can be applied to invert any one of the other forms. The particular example illustrates a rotary table, work support, or machine support, which is used for circular indexing. The drawing shows a base 143 which has a bearing 144 providing a rotational mount for a table 145 provided with the usual work attaching T-slot means 146. In operating mechanism the device of Figure 51 is in effect a reversal of Figure 48, the strain gear 71 being splined at the opposite end at 135 to engage with cooperating splines on the base 143, and being held in place by ring 136' which makes a force fit around the strain gear. The strain gear internally engages external teeth on the inverted so-called ring gear 70 provided on the outside of the rotary table 145. A plain bearing strain inducer is conveniently used in this form as it is desirable to take advantage of the frictional engagement to make the table self-locking. When the strain inducer 72 is circular on the outside diameter, it is machined on the inside with a slight eccentricity so as to produce the desired strain wave in the strain gear. The interior is purposely machined to produce a slightly excessive deflection so that it will positively assure complete absence of backlash by spring loading the strain gear. This will cause a slight unobjectionable distortion in the strain inducer ring when it is assembled. Since all the parts are inverted, the teeth on the strain gear are on the inside and the mating teeth on the table are external as just explained. The strain inducer is suitably provided with index marks and these are read to a reference line on the forced fit ring 136'. With this design the ratio between the strain inducer and the table can be made in the range from about 90 to 1 to 360 to 1. With 360 to 1 as the ratio and an 8 inch table the index marks for ten second graduations are more than 1/16 inch apart, thus assuring an extremely precise adjustment. The rotary table has extreme rigidity and zero backlash so that machine operations can be performed in the various positions or settings of the table without the necessity to provide external locking devices. It will, however, be understood that external locking can be employed if desired. In order to further assure a relatively tight fit, the table is held down on the base by a washer 147 secured by a bolt 148, and the washer will desirably be a Bellville washer or Bellville spring to provide pre-load of the bearing in the axial direction.

For some purposes it is desirable to obtain gear ratios which are substantially higher or substantially lower than those which can be conveniently secured from standard or inverted strain wave gearing of the single type. For such purposes dual or higher multiple strain wave gearing will be used. Illustrations of this are shown in Figures 52 and 53.

In Figure 52, there are two stages of strain wave gearing arranged in one housing. Ring gear 150 at one side is secured to housing 151 which is desirably stationary. The strain gear 152 has external teeth 152' and 155, and thus comprises two strain gears. The ring gear 150 meshes with external teeth 152' on one end of strain gear 152, under the action of strain inducer 153 which is turning with shaft 154 by which the input load is applied. The strain gear 152 at a longitudinally displaced position, has external teeth 155 which are acted on interiorly by the same strain inducer, and which exteriorly mesh with second internal ring gear 156 which has bearing support at 157 on the housing and is conveniently integral with the output shaft 158. The two sets of teeth on the strain gear are made with a maximum difference of a few teeth so that they do not differ greatly in pitch diameter. Consequently the difference in the deflection is so small that only one strain inducer is required and the two sets can be combined in a single ring without the need for substantial axial displacement between one set and another to allow for relative adjustment by flexibility of the intermediate tube.

It will be understood, however, that if the axial displacement between the two sets of teeth on the strain gear is adequate, there can be wide disparity in the strain inducers, for example, one having two lobes and the other having three lobes.

This type of dual strain wave gearing is capable of producing enormous gear ratios without a multiplicity of parts. With a plain bearing strain inducer, ratios up to 200,000 to 1 can easily be obtained. With a planetary type strain inducer it is apparent that higher ratios are obtainable, up to enormous ratios of the order of 2,000,000 to 1. These enormous ratios are caused by the direction of rotation of one strain wave gear opposing or partially cancelling the rotation of the driven gear. For example, if the strain inducer 153 is rotated clockwise in Figure 52, the strain gear teeth 152 will rotate in the opposite direction or counterclockwise. At the same time, the other strain gear teeth 155 integral therewith are tending to drive the driven gear 156 the same direction as the strain inducer or clockwise. Consequently one adds and the other subtracts from the overall motion and by correctly determining the difference in the number of teeth, the very high gear ratios can be obtained.

This relation can best be shown by reducing each strain wave gear to its own specific gear ratio. Any suitable formula in Table 2 can be used for this purpose if we remember that the gear with the largest number of teeth turns in the same direction as the strain inducer. Since multiplication, addition, and subtraction enter into the calculations for dual strain wave gearing, it is mandatory that we use proper signs in designating directions. If the movement is in the same direction as the strain inducer, it is considered "plus." If the movement is opposite to that of the strain inducer, it is considered "minus." One simple method of always obtaining the proper ratio and sign is to divide the diameter of the gear being driven by the diameter of the gear being driven minus the diameter of the mating gear. When this is done the divisor will always be negative when the gear being driven has the smaller diameter, thus producing a negative or opposite direction gear ratio.

Applying this analysis to Figure 52, it will be evident that one revolution of the plain bearing strain inducer will cause the strain gear $S_F$ to rotate the reciprocal of the ratio $$R_F \text{ or } \frac{1}{R_F}$$

and since this rotation is in the opposite direction the result is $$\frac{1}{-R_F}$$

Since the strain inducer has rotated one turn to its original position and the strain gear $S_F$ has moved $$\frac{1}{-R_F}$$

the strain inducer has moved $$1+\frac{1}{R_F}$$

turns in relation to the strain gear $S_F$. One revolution of the strain inducer in relation to the strain gear $S_D$ (which is directly coupled and integral with $S_F$) would move the driven gear D the reciprocal of its gear ratio or $$\frac{1}{R_D}$$

Since this would move thje same direction it is positive. Consequently, the motion of the driven gear D would become $$\left(1+\frac{1}{R_F}\right)\left(\frac{1}{R_D}\right)$$

for the relative motion which has taken place between the strain inducer and the strain gear $S_F$. As the two strain gears are coupled together, the motion of $$S_F \text{ or } \frac{1}{-R_F}$$

must be added to this.

$R_D$=Ratio of driven side
$R_F$=Ratio of fixed side

With 1 revolution of the strain inducer $S_F$ rotates $$\frac{1}{-R_F}$$

revolutions and the strain inducer has rotated $$1 \text{ plus } \frac{1}{R_F}$$

in relation to $S_F$.

$$\therefore D \text{ rotates } \left(1+\frac{1}{R_F}\right)\times\frac{1}{R_D}+\frac{1}{-R_F}$$

The reciprocal of this=Total Ratio=$\frac{\text{Input Turns}}{\text{Output Turns}}=R$ $$R=\frac{-R_F R_D}{R_D-R_F-1} \quad (20)$$

$$R=\frac{DS_F}{DS_F-FS_D} \quad (21)$$

The reciprocal of this, shown above in Formula 20, would be equal to the overall gear ratio. If the proper signs are considered, the formula can be stated simply.

"the product of the ratios divided by the sum of the ratios minus 1." This basic formula is shown below in Formula 23 and it is correct for all forms of dual strain wave gearing. Formula 21 applies specifically to dual strain wave gearing of the type of Figure 52, and was calculated by other means as a check on the above analysis.

Figure 53 illustrates a dual combined strain wave gear. Over at the right the construction substantially resembles that of Figure 52, except that the strain inducer extends inside only one side of the strain gear and the strain gear has external teeth which extend the full length and engage a correspondingly elongated ring gear 150'. At the opposite end from the strain inducer the strain gear has internal teeth 160 which mesh with an external driven gear 161 carried on the output shaft 158.

In effect, one side of the device is a standard strain wave gear form and the other side is an inverted form. The strain inducer produces deflection of the strain gear which causes the strain wave to act both in respect to the external teeth and the internal teeth in the manner above described. This arrangement is useful for very low gear ratios of the order of 30 to 1 when produced with steel, small diameter strain wave gears.

The following formulae were developed by analysis of the motions of these gears after the manner of that already described in respect to Figure 52:

$$R=\frac{-R_F(-R_D)}{-R_D-R_F-1} \tag{22}$$

$$R=\frac{R_F R_D}{R_F+R_D-1} \tag{23}$$

It will be evident that Formula 22 differs from Formula 20 only in respect to the sign of $R_F$ and $R_D$. If the proper signs are considered when calculating the individual ratios, basic Formula 23 may be used for gears of any of the dual strain-wave types.

In some cases it will be desirable to propagate the strain wave by electromagnetic means, employing, for example, electromagnets which progressively act on and are distributed around one of the rings, which may be a strain inducer ring or one of the rings of the gearing combination. The difference between the diameters of the sleeve or ring which is being acted on and the electrical field and the number of poles and phases will determine the r.p.m. of the strain inducer.

In many instances it will not be necessary to use teeth since actual metal-to-metal contact of the inner and outer ring under the magnetic forces will be sufficient to relatively move one of the rings, although, of course, teeth can be used where desired.

Figure 54 shows the principle of the invention applied to polyphase energization. A ring or sleeve 162 of any of the other forms of the invention is surrounded by electromagnets 163 to 168 inclusive and the opposed pairs of electromagnets are placed in circuits for the different phases of a three-phase electric system, the respective phases being numbered 1, 2, and 3 to indicate the connections. Of course, magnetic coupling can be increased by magnetically susceptible bars or chains to reduce the reluctance of the flux path.

The gear ratio is a simple function of the electric field rotation and the relative diameters and the formulae of the strain wave gearing mechanical forms apply.

If desired, single phase energization can be used. In Figure 55 a ring 162 is acted on by a traveling electromagnetic wave produced by electromagnets 170 to 177 inclusive, arranged with the opposed pairs in the same circuit branch. The single phase source is connected at 178 and 180 to parallel branches 181 and 182. The branch 181 has a rectifier 183 and the branch 182 has a rectifier 184 relatively opposed to the rectifier 183. The branch 181 divides into a branch 185 which includes in series opposed electromagnets 172 to 176 and a branch 186 which includes in series capacitor 187 and opposed electromagnets 173 and 177 which are 45° further around. The branch 182 divides and includes branch 188 which has in series opposed electromagnets 170 and 174 which are 45° further along and a branch 190 which has in series capacitor 191 and opposed electromagnets 171 and 175 which are 45° further along.

The voltage phase relationships for the circuit branches 188, 190, 185 and 186 are shown in Figure 56.

EXPERIMENTATION.—EXPERIMENTAL MODELS

*Table 4*

| | Model No. 1. | Model No. 2 | Model No. 3 | Model No. 4 | Model No. 5 | Model No. 6 | Model No. 7 |
|---|---|---|---|---|---|---|---|
| Method of operation | Manual | 1/50 H.P. | 1/3 H.P. | Manual | 1/3 H.P. | Manual | Manual. |
| Type strain inducer | Ball | Ball | Ball | Ball | Ball | Cam roller | Cam roller. |
| (a) Figure number | 33 | 33 | 33 | 33 | 33 | 29 | 31. |
| (b) Number of lobes | 3 | 3 | 3 | 3 | 3 | 3 | 3. |
| (c) Lobe radius, in | .25 | .25 | .31 | .31 | 35 | 1.0 | .7. |
| (d) Outer face | No | No | No | No | Yes | Yes | Yes. |
| (e) Deflection, in | .020 | .020 | .030 | .030 | .030 | .040 | .035. |
| Arrangement fig. number | 46 | 45 | 45 | 45 | 46 | 46 | 48. |
| Ratio between gears | 100/1 | 80/1 | 80/1 | 80/1 | 80/1 | 120/1 | 120/1. |
| Overall ratio | 314/1 | 320/1 | 250/1 | 240/1 | 270/1 | 120/1 | 470/1. |
| Gear diameter, in | 2.0 | 1.6 | 2.4 | 2.4 | 2.4 | 4.75 | 4.2. |
| Teeth in ring gear | 302 | 243 | 243 | 243 | 243 | 360 | 360. |
| Teeth in strain gear | 299 | 240 | 240 | 240 | 240 | 357 | 357. |
| Pressure angle, deg | 35 | 27 | 27 | 30 | 27 | 30 | 27. |
| Gear face, in | .25 | .20 | .40 | .40 | .20 | .5 | .44. |
| Overall diameter, in | 3.0 | 1.9 | 3.3 | 3.3 | 3.3 | 5.75 | 4.70. |
| Overall length, in | 1.6 | .37 | 1.0 | .75 | 1.75 | 3.5 | 1.75. |
| Number of cycles to date | 10,000 | 500,000 | 530,000 | 500 | 2,175,000 | 5000 | 2000. |
| Max. torque applied, lb./in. | | 150 | 1,800 | | 2,000 | 5,000 | 15,000. |
| Max. r.p.m. applied | 400 | 1,650 | 1,800 | 50 | 1,800 | 200 | 200. |
| Measured backlash | | | | | None | None | |
| Precise movement | | | | | | | Yes. |
| Measured efficiency, percent. | | >66 | >66 | | >75 | | |

In Table 4 the various models of strain wave gearing which have been tested experimentally to date are listed for comparison. All of these models were made prior to or during development of the strain wave gearing formulae and hence do not embody all of the optimum designed features. For example, for these models the strain wave form was not accurately known and the pressure angle for the teeth was conservatively selected to assure no tooth interference for a triangular wave form. Consequently, the percentage of teeth in actual contact was materially reduced. The pressure angle for the above models should have been 20° but as will be seen in Table 4, this angle varied from 27° to 35°.

While it would be expected that a difference of this amount would seriously degrade the distinctive characteristics of strain wave gearing, the magnitude of the characteristics apparently outweighed the degrading effect and all models functioned satisfactorily. Although this would materially reduce the torque capacity, no damage has been sustained by the application of the torque value shown in the table. In each instance the limiting factor for the applied torque was other structural members and not the strain wave gearing. Models 1 and 4 were specifically designed to illustrate the principle for display purposes. Models 2, 3 and 5 were designed to fit within existing housings of standard electric motors and used the strain inducer as one of the bearings for the motor armature. The noise level of the motor was not increased by the addition of the strain wave gearing. Models 6 and 7 were designed for accurate manual control purposes for a device which required a minimum of 2,000 pound-inches torque capacity with an exceedingly high dynamic shock factor.

The number of cycles to which these various models have been subjected is estimated except in the case of model 3 which has been subjected to 530,000 cycles and model 5 which has been subjected to 2,175,000 cycles. Time checks were made on these two models and they were periodically examined for wear and lubrication distribution. These tests were conducted under light load with an occasional load of the amount indicated. No wear was discernible under examination by a 35 power microscope and the original light coating of grease sufficed throughout the entire test. Apparently, the action of the gears tends to distribute the grease throughout all the teeth and hold it properly in place.

In the case of model 5 the outer race of the strain reducer was left in the annealed condition to ascertain whether the contact pressures were of the magnitude indicated by Formula 14. The entire test of 2,175,000 cycles was conducted with this soft race but after each operation against the indicated torque there was evidence that the surface of the raceway was becoming deformed under the rolling action of the ball. Calculating from the known yield strength in compression of the race, it was found that Formula 14 is correct. Further tests on this model are being continued using a properly-hardened race.

Backlash was measured by a dial indicator at the end of a lever arm attached to the output shaft. For model 5 a 12-inch lever arm was used and for model 6 a 100 inch 4½ inch diameter tube was employed as a lever arm. No measurable backlash could be detected in the tests. On model 7 a partial check was made of precise motion by measuring with a dial indicator the movement of the end of the 100 inch lever arm in relation to one degree rotation of the input. Within the accuracy of the test conditions, which was in this case only fair, the ratio was constant.

The indicated efficiencies for models 2, 3 and 5 were measured under static light load conditions and include the rotational resistance of the motor armature and the starting switch. The efficiency of all models has been sufficiently high to permit driving the input by the application of the above torque to the output. In model 7, with an overall gear ratio of 470 to 1, it was necessary to include a self-energizing friction pad coupled to the input to reduce the efficiency so that the output torque would not rotate the input.

A commercial bearing having a central ridge in the outer raceway was tested. This ridge has a degree of self-correction. This bearing uses rollers similar to those shown in Figure 42. A bearing of this character was altered by reducing the outer raceway to the desired thickness by machining. The bearing then had the inner raceway distorted elliptically so that the major axis of the outer race was 2.415 inches and the minor axis 2.350 inches. The bearing was operated at 650 r.p.m. for more than 2,000,000 revolutions without lubrication, heating or wear problems. For the purpose of strain-wave gearing it is preferable to have the central roll guiding ridge on the outside of the inner race rather than the inside of the outer race, since the increased depth of section and therefore stiffness provided by this ridge in the outer race is undesirable when the outer race is being flexed in strain-wave gearing.

A standard torque tube ball bearing without any alteration was distorted elliptically so that its major axis was 2.907 inches and the minor axis was 2.845 inches. This bearing was run at 2,800 r.p.m. to determine its stabilization temperature which appeared to be approximately 25° F. rise. It was then operated for well over 2,000,000 cycles at 650 r.p.m. without lubrication, heating or wear problems. This bearing was also operated for a limited number of cycles with the major axis 0.126 inch larger than the minor axis and no adverse effects resulted. In both of these bearings referred to above, the shape of the wave form on the outer race was measured, and it was found to conform exactly within the limits of experimental error to the shape of the wave form determined in a deflected ring as already described.

It will be evident that a wide variety of variance of each of a number of different features of the invention have been explained, and that each of these variants is capable of use in combination with any one of each of the other types of variants. In order to simplify the disclosure and avoid the illustration of a great multiplicity of relatively duplicatory design, no attempt is being made to outline each of the various permutations and combinations provided by any one of the strain inducers, used with any one of the strain gears, with any one of the ring gears, and with any of the other modifications, such as the single, dual or multiple gearing aspects. It will, of course, be evident that strain wave gearing of one character can be used to drive strain wave gearing of another character, or can be used in train with conventional gearing or with other mechanical movements.

It will be, of course, evident that the input and the output will take the form of any mechanism for applying and for receiving load application, and is not to be construed to be limited to a shaft, or to any particular form of gearing or other mechanism. It will be, of course, evident that in strain wave gearing in accordance with the invention that there will be at least one strain inducer, at least one strain gear, and at least one cooperating ring gear, and that providing the gear mechanism is adequate, any one of these elements may constitute the input, and any other one may constitute the output, it being recognized that the third element may perform any desired auxiliary function, such as bearing support, sealing, fixed support, or it may constitute a portion of the input or a portion of the output. For example, either the input or the output can be divided between two of the elements as desired.

It will likewise be evident that while strain inducers of a mechanical character have been illustrated, the strain wave can be applied by any means, whether electrical, magnetic, hydraulic, pneumatic, or vibratory which will generate and propagate a progressive strain wave.

In view of my invention and disclosure, variations and modifications to meet individual whim or particular need will doubtless become evident to others skilled in the art to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. In a device for transmitting motion, a first gear having teeth, a second gear of different pitch diameter from the first having teeth of the same circular pitch as the first gear, said second gear being coaxial with the first gear and having a deflectable wall, a strain-inducing element operative to deflect the second gear, and to maintain the second gear deflected in such manner that its teeth are interengaged with the teeth of the first gear in at least two angularly spaced positions interspaced by positions at which the teeth are not interengaged, and means for rotatively advancing said positions, thereby propagating a strain wave along the deflectable wall of the second gear to cause relative rotation between the second gear and the first gear.

2. A device of claim 1, having two opposed positions at which the teeth are interengaged.

3. A device of claim 1, in which the second gear is positioned inside the first gear and the external surface of the second gear engages the first gear.

4. A device of claim 1, in which the second gear surrounds the first gear and the interior surface of the second gear engages the first gear.

5. A device of claim 1, in which the strain-inducing element is driven, to in turn drive one of the gears.

6. A device of claim 1, in which the strain-inducing element is driven to drive the first gear and the second gear is stationary with respect to rotation.

7. A device of claim 1, in which the strain-inducing element is driven to drive one of the gears, and the first gear is stationary with respect to rotation.

8. A device of claim 1, in which the strain-inducing element comprises a rotating cam surface continuously engaging the second gear at spaced points which create the spaced deflection, said surface of the strain-inducing element directly engaging the second gear.

9. A device of claim 1, in which the strain-inducing element comprises a raceway in contact with one circumferential surface of the second gear, and means including bearing elements travelling in the raceway for propagating a strain wave against the wall of the raceway.

10. A device of claim 9, in which the strain-inducing element also comprises a second raceway of eccentric form cooperating with the aforesaid raceway and bearing elements travelling in the two raceways and transmitting a strain wave from the second raceway through the aforesaid raceway to the second gear.

11. A device of claim 1, in which the strain-inducing element comprises cam means and means for moving the same along a path which propagates a strain wave in the second gear.

12. A device of claim 1, in which the height of the strain wave conforms to the formula $$D_R - D_E$$

where $D_R$=Pitch diameter of first gear
$D_E$=Effective pitch diameter of second gear.

13. A device of claim 1, in which the first gear is outside the second gear, and the strain-inducer is inside the second gear.

14. A device of claim 1, in which the second gear has lugs, in combination with cooperating means having radially extending recesses which engage the lugs on the second gear and permit the second gear to deflect radially while maintaining the same circumferential position as that of the cooperating means.

15. A device of claim 14, in which the input is connected to the strain-inducer at one end and the output is connected to the second gear at the other end.

16. A device of claim 1, in which the second gear comprises an elongated tube having gear teeth adjacent one end, and having relative support at a remote position which permits axial deflection of the gearing.

17. A device of claim 1, in which the second gear comprises a housing wall deflectable and forming a hermetic closure through which motion is transmitted, the first gear being on one side and the strain-inducer on the other side of the housing.

18. A device of claim 1, in which the output is the gear having the largest number of teeth, which moves relatively in the same direction as the strain-inducer.

19. A device of claim 1, in which the first gear is inside the second gear and the strain-inducer is on the ouside of the second gear.

20. A device of claim 1, in which the gear teeth on the first and second gears have face to face engagement over an extended mating area.

21. A device of claim 1, in which the interengaging gear teeth have face-to-face engagement over an extended area which is a maximum adjoining a position which corresponds to the maximum of the strain wave, and in which the area of face-to-face engagement of the teeth progressively diminishes on either side thereof.

22. A device of claim 1, in which the cooperating gear teeth are in face-to-face engagement over a substantial area at points adjoining the peak of the strain wave, and in which the teeth make engagement on both sides at a particular tooth position, and respectively engage on opposite sides of the teeth on the respective opposite sides of that tooth position.

23. A device of claim 1, in which the first and second gears have cooperating gear teeth of the same diametral pitch but of different pitch diameter and in which the number of teeth on the first and second gears is slightly different.

24. A device of claim 23, there being lobes on the strain inducer, in which the difference in the number of teeth of the first and second gears is equal to the number of lobes on the strain-inducer.

25. A device according to claim 1, in which the gear ratio is expressed by the formula $$\frac{D_D}{d}$$

where $D_D$=pitch diameter of the driven gear
$d$=the tooth deflection or the height of the strain wave.

26. A device of claim 1, there being lobes on the strain inducer, having respective inner and outer teeth on the first and second gears, in which the pressure angle of the teeth is equal to $$\tan^{-1}\frac{1.091}{n}$$

where $n$ is the number of lobes in the strain-inducing element.

27. A device of claim 1, in which the number of cooperating gear teeth per inch of diameter on both the first and the second gears is equal to the number of waves in the circumference divided by the height of an individual wave.

28. A device of claim 1, in which the number of waves in the circumference is equal to the difference between the number of teeth of the two gears.

29. A device of claim 1, having two lobes on the strain-inducing element, and having a tooth pressure angle of 28.6 degrees.

30. A device of claim 1, in which more than 50 percent of the teeth on the respective gears are constantly in engagement with one another, and half of the teeth in engagement oppose the other half of the teeth in engagement.

31. A device of claim 1, which is free from bearings on the moving elements adjoining the device, the bearing support being provided by stationary support of one of the first gear, the second gear and the strain-inducing element.

32. A device of claim 1, in which the teeth from the time they make contact with one another until the time they leave contact are moving at the same velocity.

33. A device of claim 1, in which all side thrust from the device is compensated by opposing side thrust within the device itself.

34. A device of claim 1, in combination with a table operatively turning with one of the first gear, the second gear and the strain-inducing element, and thereby angularly positioned in precise relationship.

35. In a device for transmitting motion, a first gear element, a second gear element concentric therewith, the first and second gear elements being one within the other, the first gear element and the second gear element each having integral teeth and said teeth interengaging, means for deflecting the teeth of the first gear element locally into engagement with the second gear element, and means for advancing the point of interengagement between the gear elements along the same while relatively separating the gear elements by deflection at other positions.

36. In a gearing system, a first gear having integral teeth, a second gear having integral teeth cooperating with the teeth on the first gear, the first and second gears being coaxial and one within the other, and means for manipulating the teeth of the first and second gear relatively into individual engagement by relative radial motion toward and away from one another.

37. In a gearing system, a pair of coaxial cooperating gears, one within the other, having integral teeth on the first and second gears interengaging with one another, and means for resiliently deflecting the teeth into and out of engagement with one another over a generally sinusoidal path.

38. In a gearing system, a first gear, a second gear having teeth individually deflecting into mating relation with the first gear, the first and second gears being one within the other, in which the pressure angle of the teeth is equal to $$\tan^{-1}\frac{1.091}{n}$$

where $n$ is the number of waves in the circumference, and means for deflecting the second gear radially to bring the teeth of the second gear into engagement with the teeth of the first gear.

39. A gearing system comprising cooperating relatively internal and external gears each having integral teeth, and means for deflecting said teeth on one of the gears into engagement with the other gear and thereby changing the shape of its wall, in which the pitch diameter of the deflected gear at the points of tooth interengagement is greater than the pitch diameter of the deflected gear prior to deflection.

40. In a gearing system, a pair of cooperating gears, one within the other, and means for straining one of the gears into engagement with one of the other gears, and thereby creating a strain wave, the gears having different numbers of teeth and the difference between the numbers of teeth on the respective gears equalling the number of strain waves per circumference.

41. In a gearing system, a pair of cooperating gears, one within the other, each having integral teeth and means for straining and thereby deflecting the wall of one of the gears into tooth engagement with the other gear, the teeth sliding into and out of tooth engagement with respect to one another in a radial direction.

42. In a gearing system, a first gear and a second gear coaxial relatively one within another, and having relative motion with respect to one another, the first and second gears having integral teeth which interengage with one another, there being constant intermeshing of at least 50 percent of the teeth of the respective gears with one another, and means for deflecting the second gear radially to bring the teeth on the second gear into engagement with the teeth on the first gear.

43. A gearing system having relative internal and external gears enmeshed with one another and having on each gear one group of teeth on one side of a particular point and another group of teeth on the other side of a particular point in engagement on opposed sides of the teeth, the gearing system being completely without backlash, and means for deflecting the second gear radially to bring the teeth on the second gear into engagement with the teeth on the first gear.

44. In a gearing system, a pair of relatively internal and external gears of different diameters having integral teeth on the gears intersplined together at a plurality of circumferentially spaced points with intermediate nonmating points, and means for changing the position of the intersplining of the gears and thereby relatively advancing one gear with respect to the other gear.

45. A gearing system having a pair of coaxial cooperating relatively internal and external gears each having integral teeth, intermating with one another simultaneously at a plurality of spaced points spaced by intermediate nonmating points, having relative motion to one another and only one of the gears having a pitch line velocity, and means for deflecting one of the gears radially to bring its teeth into engagement with the teeth on the other gear.

46. A gearing system comprising relatively inner and outer cooperating gears, one of which is the output, having relative motion with respect to one another and one of the gears elastically deforming to make the gears cooperate, and input means for applying a relative rotational motion to the gears, all teeth of both of the gears being in engagement with one another for one revolution of the input means.

47. A gearing system comprising relatively inner and outer coaxial cooperating gearing of different diameters and relatively moving with respect to one another, said gears having integral interengaging teeth, and means for applying a rotatory motion to one of the gears, while developing an input stress in the gear which is at a different place from the output stress.

References Cited in the file of this patent

UNITED STATES PATENTS

| | | |
|---|---|---|
| 1,158,457 | Dey | Nov. 2, 1915 |
| 1,543,791 | Pitter | June 30, 1925 |
| 2,030,700 | Hoxie | Feb. 11, 1936 |
| 2,285,910 | De Buigne | June 9, 1942 |
| 2,421,463 | Noreyko | June 3, 1947 |

FOREIGN PATENTS

| | | |
|---|---|---|
| 249,805 | Great Britain | Oct. 14, 1926 |
| 350,466 | Great Britain | June 8, 1931 |

UNITED STATES PATENT OFFICE

Certificate of Correction

Patent No. 2,906,143 September 29, 1959

C Walton Musser

It is hereby certified that error appears in the printed specification of the above numbered patent requiring correction and that the said Letters Patent should read as corrected below.

Column 5, line 27, for "rotary" read —rotatory—; column 11, line 42, for "where" read —were—; line 59, before "plotting" strike out "the"; column 14, lines 29 to 31, for the extreme right-hand portion reading $$\frac{\pi D}{n} \quad \text{read} \quad \frac{\pi D}{N}$$

column 15, line 21, for "applied" read —apply—; column 16, line 37, Equation (11) should appear as shown below instead of as in the patent:

$$T_o = .63r^2F\delta,$$

same column, line 50, Equation (16), for the left-hand portion reading "$SP=$" read —$S_p=$—; column 19, lines 31 and 32, for "radical" read —radial—; same line 32, for "erlatively" read —relatively—; column 28, line 5, for "thes hims" read —the shims—; column 30, line 5, for "bear" read —gear—; columns 35 and 36, Table 4, first column thereof, sixth line, for "(*d*) Outer face" read —(*d*) Outer race—.

Signed and sealed this 10th day of May 1960.

[SEAL]

Attest:
KARL H. AXLINE,
*Attesting Officer.*

ROBERT C. WATSON,
*Commissioner of Patents.*